(12) United States Patent
Shu et al.

(10) Patent No.: US 11,194,598 B2
(45) Date of Patent: Dec. 7, 2021

(54) INFORMATION DISPLAY METHOD, TERMINAL AND STORAGE MEDIUM

(71) Applicant: GUANGDONG OPPO MOBILE TELECOMMUNICATIONS CORP., LTD., Guangdong (CN)

(72) Inventors: Maofei Shu, Guangdong (CN); Yaojun Luo, Guangdong (CN)

(73) Assignee: SHENZHEN HEYTAP TECHNOLOGY CORP., LTD., Guangdong (CN)

( * ) Notice: Subject to any disclaimer, the term of this patent is extended or adjusted under 35 U.S.C. 154(b) by 0 days.

(21) Appl. No.: 16/643,832

(22) PCT Filed: Sep. 8, 2017

(86) PCT No.: PCT/CN2017/101132
§ 371 (c)(1),
(2) Date: Mar. 2, 2020

(87) PCT Pub. No.: WO2019/047184
PCT Pub. Date: Mar. 14, 2019

(65) Prior Publication Data
US 2021/0064394 A1 Mar. 4, 2021

(51) Int. Cl.
*G06F 3/048* (2013.01)
*G06F 9/451* (2018.01)
(Continued)

(52) U.S. Cl.
CPC ............ *G06F 9/451* (2018.02); *G06F 3/0482* (2013.01); *G06F 3/0488* (2013.01); *G06T 3/40* (2013.01)

(58) Field of Classification Search
CPC ....... G06F 3/0482; G06F 3/0488; G06F 9/451
See application file for complete search history.

(56) References Cited

U.S. PATENT DOCUMENTS

2009/0228820 A1* 9/2009 Kim .................... G06F 3/04817
715/769
2012/0124515 A1* 5/2012 Li ......................... G06F 3/0482
715/808
(Continued)

FOREIGN PATENT DOCUMENTS

CN  103430519  12/2013
CN  105511746   4/2016
(Continued)

OTHER PUBLICATIONS

"Samsung Galaxy Note 4 Smartphone User Manual", 2014, pp. 2, 10, 16-18, 39, 48, 54 (Year: 2014).*
(Continued)

*Primary Examiner* — Claudia Dragoescu
(74) *Attorney, Agent, or Firm* — Hodgson Russ LLP

(57) ABSTRACT

The embodiments of the disclosure provide an information display method, device and terminal, relating to the field of human-computer interaction technologies. The method includes: acquiring a target file; displaying a navigation bar, the navigation bar comprising an operation control of the target file; receiving a first touch signal triggered on the operation control; and displaying, according to the first touch signal, a program entry of at least one application, the at least one application being configured to process the target file. By adding the display of the operation control of the target file, where the operation control is configured to trigger the program entry of the application for processing the target file, so function entries for processing the obtained files are increased based on the original virtual buttons, and the functions of the navigation bar are enhanced.

20 Claims, 17 Drawing Sheets

(51) Int. Cl.
G06F 3/0482 (2013.01)
G06F 3/0488 (2013.01)
G06T 3/40 (2006.01)

(56) References Cited

U.S. PATENT DOCUMENTS

2013/0326563 A1   12/2013   Mulcahy et al.
2016/0378281 A1*  12/2016   Sirpal .................. G06F 3/0488
                                                              715/779

FOREIGN PATENT DOCUMENTS

| CN | 107133003 | 9/2017 |
| WO | 2013152556 | 10/2013 |
| WO | 2017049769 | 3/2017 |

OTHER PUBLICATIONS

WIPO, ISR for PCT/CN2017/101132, May 30, 2018.
EPO, Extended European Search Report for EP Application No. 17924051.0, dated Jul. 30, 2020.

* cited by examiner

INFORMATION DISPLAY METHOD, TERMINAL AND STORAGE MEDIUM

CROSS-REFERENCE TO RELATED APPLICATION

This application is a U.S. national phase application of International Application No. PCT/CN2017/101132, filed Sep. 8, 2017, the entire disclosure of which is incorporated herein by reference.

TECHNICAL FIELD

The present disclosure relates to the field of human-computer interaction technologies, and more particularly, to an information display method and device, and a terminal.

BACKGROUND

In terminals using the Android operating system, a navigation bar is displayed in a bottom area of a touch screen. There may be three virtual buttons, Back, Home, and Menu, displayed on the navigation bar.

When the touch screen shows a user interface of an application, the navigation bar is continuously displayed in the bottom area of the touch display. When the terminal receives a click signal triggered by the Back button, it displays a previous user interface of the application; when the terminal receives a click signal triggered by the Home button, it displays the homepage (also called as screen page) of the operating system; when the terminal receives a click signal triggered by the Menu button, it displays a multi-task switching page, which is configured to switch among multiple applications.

SUMMARY

The present disclosure provides an information display method and device, and a terminal. The technical solutions are as follows.

According to a first aspect of the embodiments of the disclosure, an information display method is provided. The method includes:
acquiring a target file;
displaying a navigation bar, the navigation bar comprising an operation control of the target file;
receiving a first touch signal trigged on the operation control; and
displaying, according to the first touch signal, a program entry of at least one application, the at least one application being configured to process the target file.

According to a second aspect of the embodiments of the disclosure, an information display device is provided. The device includes:
an acquiring module, configured to acquire a target file;
a display module, configured to display an operation control of the target file in a navigation bar;
a receiving module, configured to receive a first touch signal trigged on the operation control;
the display module further being configured to display, according to the first touch signal, a program entry of at least one application, the at least one application being configured to process the target file.

According to a third aspect of the embodiments of the disclosure, a terminal is provided. The terminal includes a processor and a memory, the memory stores at least one instruction, and the at least one instruction is loaded and executed by the processor to implement the information display method according to the first aspect of the disclosure and any of its optional embodiments.

According to a fourth aspect of the embodiments of the disclosure, a computer-readable storage medium is provided. The computer-readable storage medium has at least one instruction stored therein, wherein the at least one instruction is loaded and executed by a processor to implement the information display method according to the first aspect of the disclosure and any of its optional embodiments.

The beneficial effects of the technical solutions provided in the embodiments of the present application are:
by adding and displaying the operation control of the target file in the navigation bar, and displaying the program entry of at least one application after triggering a first touch signal on the operation control, the at least one application is used to process the target file, thus the number of steps of operating the target file by a target application is reduced, the difficulty for the user to operate a mobile terminal with one hand is decreased, the functions of the navigation bar are improved, thereby improving the efficiency of human-computer interaction.

BRIEF DESCRIPTION OF THE DRAWINGS

In order to explain the technical solutions in the embodiments of the present disclosure more clearly, the drawings used in the description of the embodiments are briefly introduced below. Obviously, the drawings in the following description are just some embodiments of the present disclosure. For those of ordinary skill in the art, other drawings can be obtained based on these drawings without paying creative labor.

DETAILED DESCRIPTION

In order to make the purposes, technical solutions and advantages of this disclosure clearer, the embodiments of the disclosure will be further described in detail below with reference to the accompanying drawings.

The word "module" mentioned herein generally refers to one or more programs or instructions stored in a memory and capable of implementing certain functions; the word "unit" mentioned herein generally refers to a functional structure divided logically, and the "unit" can be implemented by hardware or a combination of software and hardware.

As used herein, "a plurality" refers to two or more. The expression "and/or" describes the relationship between related objects and indicates that there maybe three kinds of relationships. For example, A and/or B can indicate that there are three cases in which just A exists, A and B coexist, and just B exists. The character "/" generally indicates that the related objects are in the relationship of "or".

Figure 1:
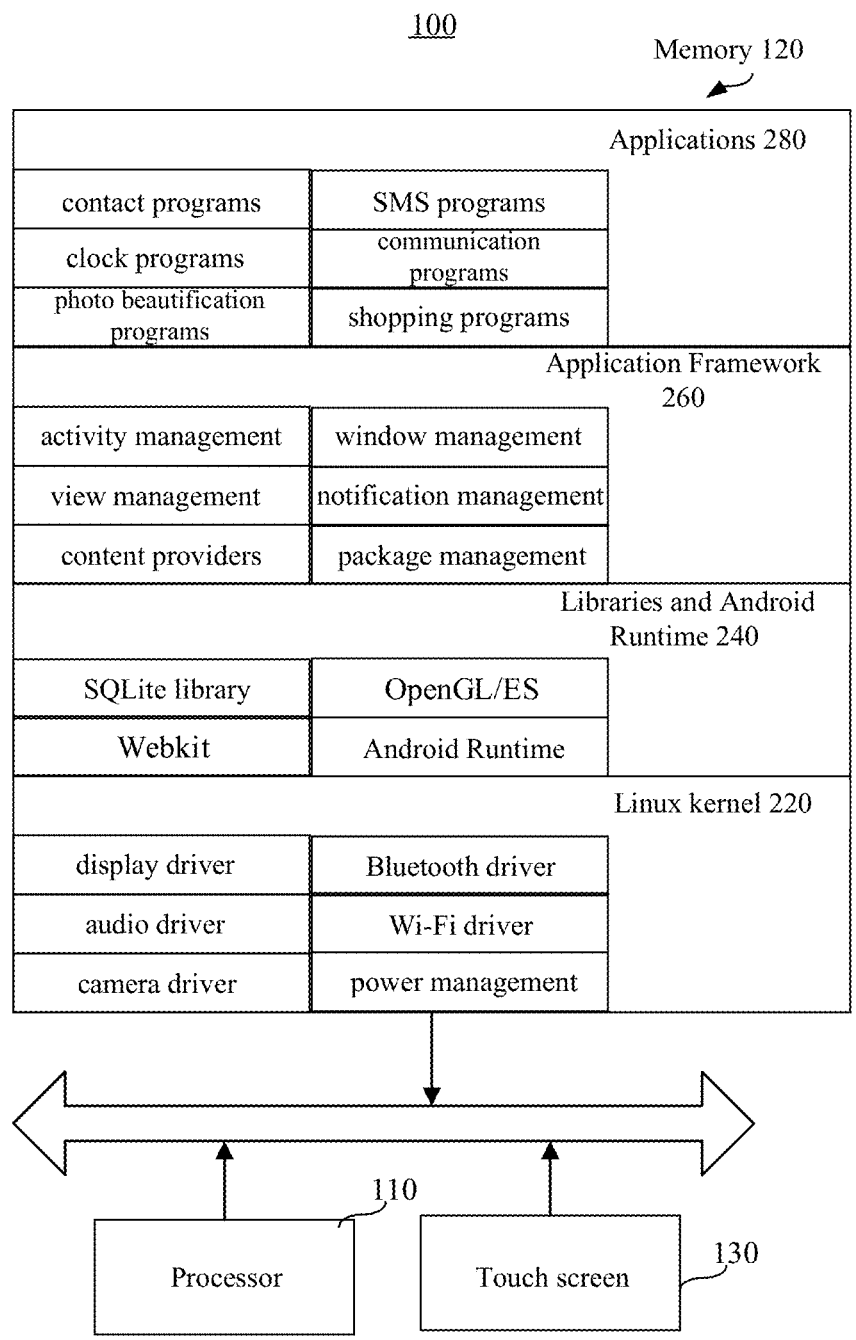
FIG. 1 is a structural block diagram of a terminal according to an embodiment of the disclosure.
Figure 2:
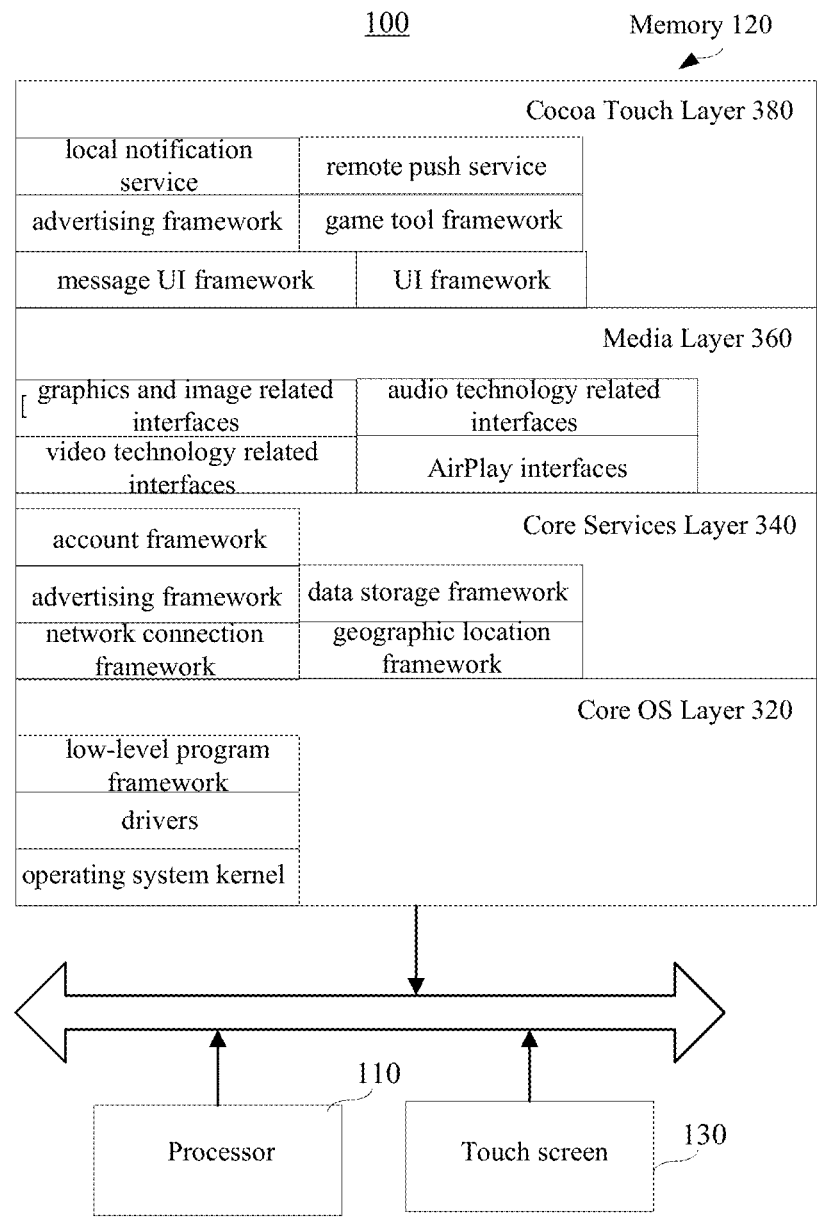
FIG. 2 is a structural block diagram of a terminal according to another embodiment of the disclosure.

Please refer to FIG. 1 and FIG. 2, which are structural block diagrams of a terminal 100 according to an embodiment of the disclosure. The terminal 100 may be a mobile phone, a tablet computer, a notebook computer, an e-book or the like. The terminal 100 of the disclosure may include one or more of the following components: a processor 110, a memory 120, and a touch screen 130

The processor 110 may include one or more processing cores. The processor 110 uses various interfaces and lines to connect various parts of the entire terminal 100, and executes the various functions and data processing of the terminal 100 by running or executing instructions, programs, code sets or instruction sets stored in the memory 120 and by calling data stored in the memory 120. Optionally, the processor 110 may use at least one hardware form of Digital Signal Processing (DSP), Field-Programmable Gate Array (FPGA), and Programmable Logic Array (PLA) to implement the executions. The processor 110 may integrate one or more of a Central Processing Unit (CPU), a Graphics Processing Unit (GPU), and a modem. The CPU mainly handles the operating system, user interfaces, and application programs; the GPU is responsible for rendering and drawing of the content required to be displayed by the touch screen 130; and the modem is used for processing wireless communication. It can be understood that the modem may not be integrated into the processor 110, and may be implemented by a single chip.

The memory 120 may include Random Access Memory (RAM), and may also just include Read-Only Memory. Optionally, the memory 120 includes a non-transitory computer-readable storage medium. The memory 120 may be used to store instructions, programs, codes, code sets, or instruction sets. The memory 120 may include a program storage area and a data storage area. The program storage area may be configured to store instructions for implementing an operating system, instructions for at least one function such as a touch function, a sound playback function, an image playback function, etc., the instructions for implementing the following method embodiments. The data storage area may store data such as audio data, phone book and the like that are created by the use of the terminal 100. The memory 120 also stores at least one instruction, which is configured to implement the information display method of the following embodiments when executed by the processor 110.

Taking the operating system is an Android system as an example, the programs and data stored in the memory 120 are shown in FIG. 1. The memory 120 stores the Linux kernel 220, the Libraries and Android Runtime 240, the Application Framework 260 and Applications 280. The Linux kernel 220 provides low-level drivers for various hardware of the terminal 100, such as a display driver, an audio driver, a camera driver, a Bluetooth driver, a Wi-Fi driver, and power management. The Libraries and Android Runtime 240 provides main feature support for the android system through some C/C++ libraries. For example, the SQLite library provides the support of database, the OpenGL/ES library provides the support of 3D drawing, and the Webkit library provides the support of browser kernel. The Libraries and Android Runtime 240 also provides the Android Runtime, which mainly provides some core libraries, which can allow developers to write Android applications using the Java language. The Application Framework 260 provides various APIs that may be used when building applications. Developers can also use these APIs to build their own applications, such as activity management, window management, view management, notification management, content providers, Package management, call management, resource management and location management. There is at least one application program is running in the Applications 280, and the at least one application program may be programs come with the operating system, such as contact programs, SMS programs, clock programs, camera applications, etc.; the at least one application program may be applications developed by third-party developers, such as communication programs, photo beautification programs, etc.

Taking the operating system is an IOS system as an example, the programs and data stored in the memory 120 are show in FIG. 2. The IOS system includes a Core OS Layer 320, a Core Services Layer 340, a Media Layer 360 and a Cocoa Touch Layer 380. The Core OS Layer 320 includes an operating system kernel, drivers, and low-level program frameworks. These low-level program frameworks provide functions closer to hardware for the program frameworks located in the Core Services Layer 340 to use. The Core Services Layer 340 provides system services and/or program frameworks required by application programs, such as a foundation framework, an account framework, an advertising framework, a data storage framework, a network connection framework, a geographic location framework, a motion framework, and the like. The Media Layer 360 provides audio-visual-related interfaces for applications, such as graphics and image related interfaces, audio technology related interfaces, video technology related interfaces, and audio and video transmission technologies such as AirPlay interfaces. The Cocoa Touch Layer 380 provides various commonly-used interface-related frameworks for application development. The Cocoa Touch Layer 380 is responsible for user touch interaction operations on the terminal 100. For example, local notification service, remote push service, advertising framework, game tool framework, message user interface (UI) framework, user interface UIKit framework, map framework, etc.

The frameworks illustrated in FIG. 3, in which related to most applications but are not limited to, are the basic framework of the Core Services Layer 340 and the UIKit framework of the Cocoa Touch Layer 380. The basic framework provides many basic object classes and data types, and provides the most basic system services for all applications, regardless of the UI. The classes provided by the UIKit framework are basic UI class libraries for creating touch-based user interfaces. IOS applications can provide UI based on the UIKit framework, so it provides the basic framework of the applications for building user interfaces, drawings, processing interaction events with the user, responding to gestures, etc.

The touch screen 130 is configured to receive touch operations on or near it by the user using a finger, a touch pen, or any suitable object, and to display respective user interfaces of applications. The touch screen 130 is generally disposed on a front panel of the terminal 100. The touch screen 130 may be designed as a full screen, a curved surface screen or a special-shaped screen. The touch screen 130 can also be designed as a combination of the full screen and the curved screen, and a combination of the special-shaped screen and the curved screen, which is not limited in this embodiment.

Full Screen

The full screen may refer to a screen design in which the touch screen 130 occupies the front panel of the terminal 100 with a screen-to-body ratio exceeding a threshold (such as 80% or 90% or 95%). A method for calculating the screen-to-body ratio is: (the area of the touch screen 130/the area of the front panel of the terminal 100)*100%; another method for calculating the screen-to-body ratio is: (the area of an actual display area in the touch screen 130/the area of the front panel of the terminal 100)*100%; still another method for calculating the screen-to-body ratio is: (a diagonal line of the touch screen 130/a diagonal line of the front panel of the terminal 100)*100%. For example, as shown in FIG. 3, the touch screen 130 occupies almost all areas on the front panel of the terminal 100, that is, except for the edges generated by the middle frame 41, all other areas of the front panel 40 of the terminal 100 are the touch screen 130. The four corners of the touch screen 130 may be right-angled or rounded.

The full screen may also be a screen design in which at least one component of the front panel is integrated inside or below the touch screen 130. Optionally, the at least one front panel component includes a camera, a fingerprint sensor, a proximity light sensor, a distance sensor, and the like. In some embodiments, other components of the front panel of the conventional terminal may be integrated in all or part of the touch screen 130. For example, the photosensitive component in the camera may be separated into multiple photosensitive pixels, each photosensitive pixel can be integrated in a black area of respective display pixel in the touch screen 130. Due to the at least one component of the front panel is integrated into the touch screen 130, the full screen may have a higher screen ratio.

In other embodiments, the component of the front panel of the conventional terminal can also be set on the side or back of the terminal 100. For example, an ultrasonic fingerprint sensor may be set under the touch screen 130, a bone-conduction receiver can be set inside the touch screen 130, and a camera is set as a pluggable structure and is disposed on the side of the terminal.

In some optional embodiments, when the terminal 100 adopts the full screen, one or more edge touch sensor 120 may be disposed at one side, or two sides (such as the left and the right sides), or four sides (such as the upper, the lower, the left and the right sides) of the middle frame of the terminal 100. The edge touch sensor 120 is configured to detect at least one of the operations such as a touch operation, a click operation, a press operation and a slide operation on the middle frame by the user. The edge touch sensor 120 may be any one of a touch sensor, a thermal sensor and a pressure sensor. The user can operate on the edge touch sensor 120 to control the applications in the terminal 100.

Curved Surface Screen

Figure 3A:
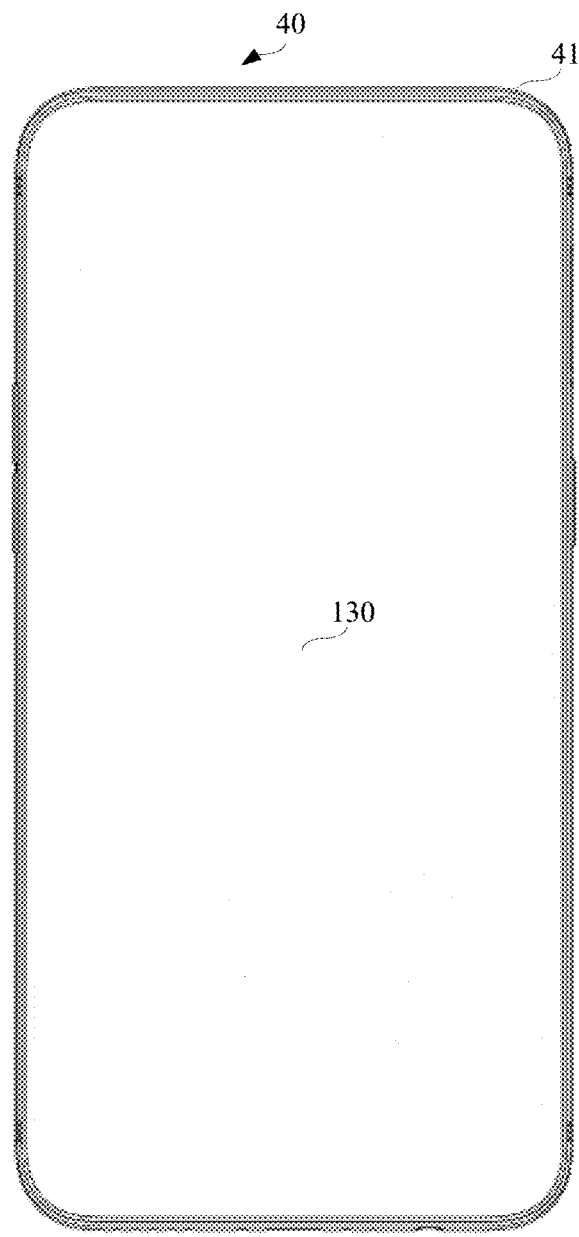
FIG. 3A to FIG. 3F are schematic diagrams showing the appearance of a terminal according to an embodiment of the disclosure.
Figure 3B:
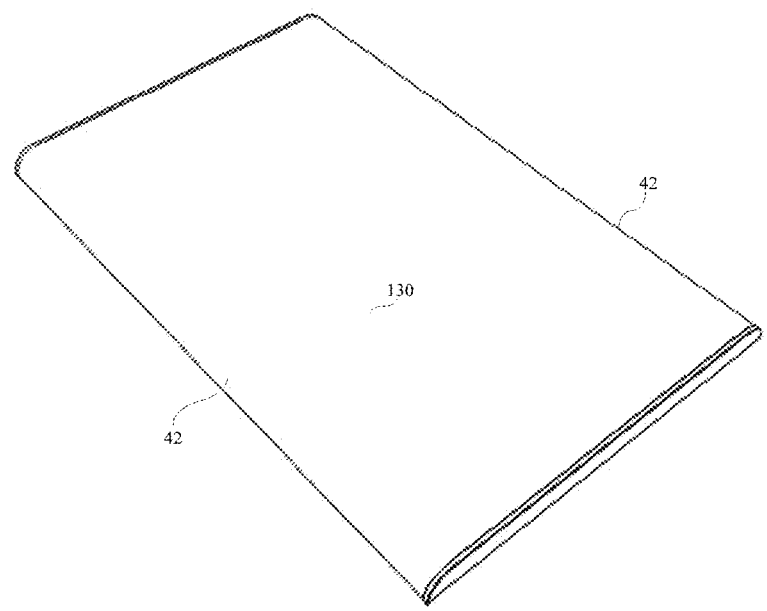

The curved surface screen refers to a screen design in which a display area of the touch screen 130 is not located in a plane. Generally, the curved surface screen is a screen design which has a cross section curved in shape, and the projection of the curved surface screen in any plane direction perpendicular to the cross section is a plane, wherein the curved shape may be U-shaped. Optionally, the curved surface screen refers to that at least one side of the touch screen 130 extends and covers the middle frame of the terminal 100. Since the side of the touch screen 130 extends and covers the middle frame of the terminal 100, the middle frame that originally has no display function and touch function is covered to be displayable area and/or operable area, so that the curved surface screen has a higher screen-to-body ratio. Optionally, in the embodiment as shown in FIG. 3B, the curved surface screen refers to a screen design that the left side and the right side 42 are curved in shape, or the upper side and the lower side are curved in shape, or four sides of the upper side, the lower side, the left side and the right side are curved in shape. In alternative embodiments, the curved surface screen is made of a touch screen material with certain flexibility.

Special-Shaped Screen

The special-shaped screen is a touch screen with an irregular shape, the irregular shape is not a rectangle or a rounded rectangle. Optionally, the special-shaped screen refers to a screen design that has protrusions, notches, and/or holes on the rectangular or rounded rectangular touch screen 130. Optionally, the protrusions, notches, and/or holes can be located at an edge of the touch screen 130, a central portion of the touch screen 130, or both of the edge and the central portion of the touch screen 130. When the protrusions, notches and/or holes is/are defined at one edge, it can be set at the middle position or two ending position of the edge; when the protrusions, notches and/or holes is/are defined at the central portion of the screen, it can be set at one or more of the regions including the upper region, the upper left region, the left region, the lower left region, the lower region, the lower right region, the right region, and the upper right region of the screen. The protrusions, notches and/or holes is/are be distributed either centrally or decentrally, symmetrically or asymmetrically, when defined in multiple regions. Optionally, the number of the protrusions, notches and/or holes is not limited.

The special-shaped screen covers the upper and/or the lower forehead area of the touch screen as the displayable area and/or the operable area, so that the touch screen takes up more space on the front panel of the terminal, so the special-shaped screen also has larger screen-to-body ratio. In some embodiments, the notches and/or holes are used to accommodate at least one component of the front panel, which includes at least one of a camera, a fingerprint sensor, a proximity light sensor, a distance sensor, an earpiece, an ambient light sensor, and a physical button.

Figure 3C:
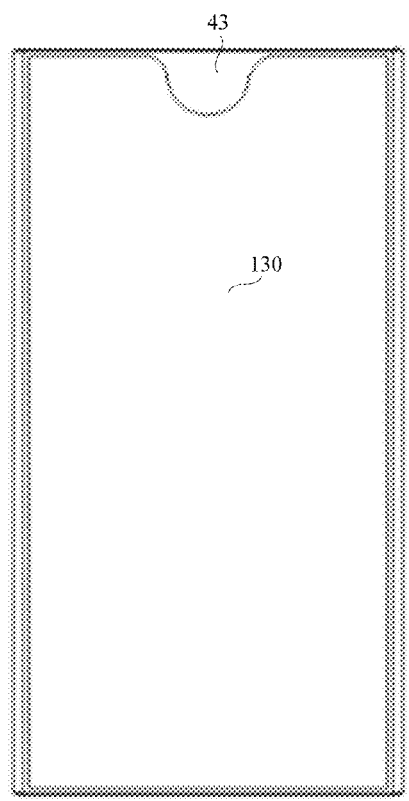
Figure 3D:
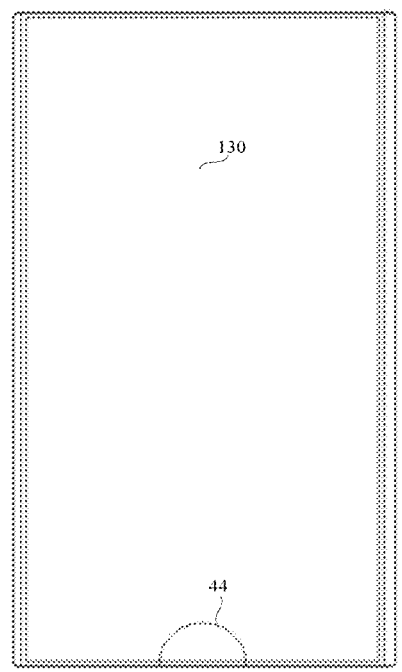
Figure 3E:
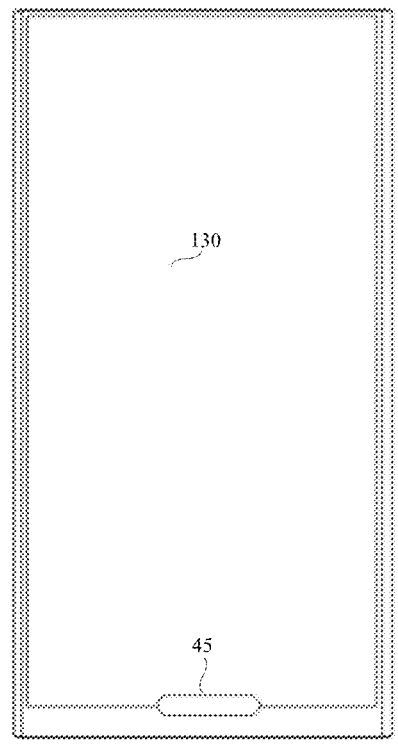
Figure 3F:
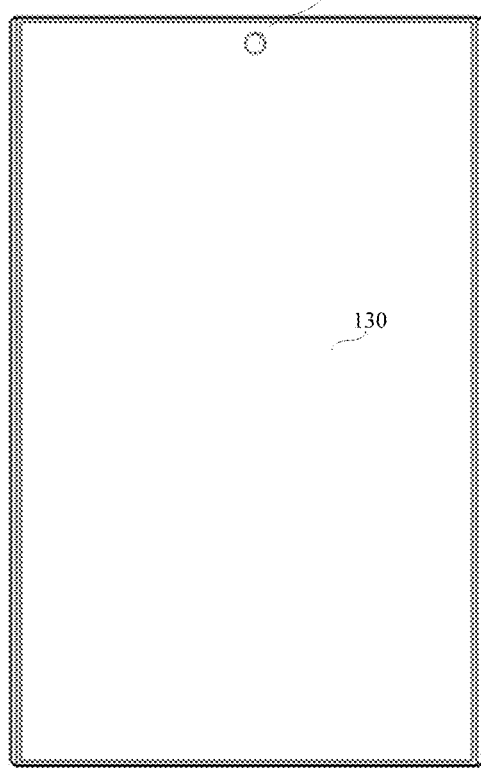

For example, the notch may be defined at one or more edges of the special-shaped screen, and the notch may be a semi-circular notch, a right-angled rectangular notch, a rounded rectangular notch, or an irregularly-shaped notch. In the embodiment as shown in FIG. 3C, the special-shaped screen may be a screen design that a semi-circular notch 43 is defined at a middle position of an upper edge of the touch screen 130. The space of the semi-circular notch is used to accommodate at least one component of the front panel such as a camera, a distance sensor (also known as a proximity sensor), an earpiece, and an ambient light brightness sensor. As shown in FIG. 3D, the special-shaped screen may be a screen design that a semi-circular notch 44 is defined at a middle position of a lower edge of the touch screen 130. The space of the semi-circular notch is used to accommodate at least one component of a physical button, a fingerprint sensor and a microphone. In the embodiment as shown in FIG. 3E, the special-shaped screen may be a screen design that a semi-elliptical notch 45 at a middle position of a lower edge of the touch screen 130, meanwhile, another semi-elliptical notch is formed in the front panel for the terminal 100, the two semi-elliptical notches enclose an elliptical area which is used to accommodate a physical button or a fingerprint recognition module. In the embodiment as shown in FIG. 3F, the special-shaped screen may be a screen design that at least one small hole 46 is defined at the upper half of the touch screen 130. The space of the small hole is used to accommodate at least one component of the front panel such as a camera, a distance sensor, an earpiece, and an ambient light brightness sensor.

In addition, the person skilled in the art can understand that the structure of the terminal 100 shown in the above drawings does not constitute a limitation to the terminal 100. The terminal may include more or less components than that illustrated in the figure, or the terminal may combine some components, or the terminal may have different component arrangements. For example, the terminal 100 further includes components such as a radio frequency circuit, an input unit, a sensor, an audio circuit, a wireless fidelity (WiFi) module, a power supply, a bluetooth module and the like, and are not described herein again.

First of all, a few terms involved in this application are introduced as follows.

Android operating system: a Linux-based free and open source operating system produced by Google Inc. of the United States, mainly used in mobile devices.

Application: App for short. In the Android operating system, each application usually includes at least one program component. There are four types of program components: Activity component, Service component, Content Provider component and Broadcast Receiver component.

Activity component: the component in the Android application that is responsible for interacting with the user. It provides a visual user interface for the Android application. An Android application can include zero to more activity components.

Content Provider component: the component in the Android application that provides data to other applications or other components in the current application, such as ringtones, wallpapers, phonebooks, etc. The Content Provider component can encapsulate data in various formats and provide it to other applications or components for use in a standard form.

Intent message: one kind of message in the Android application that enables communication between respective program components, which can be different components in the same application or different components in different applications. The intent message is responsible for describing the action of an operation in the application, the data involved in the action, and additional data. According to the description of the intent message, the Android operating system is responsible for finding the corresponding program component, passing the intent message to the invoked program component, and completing the invoke of the program component. There are two types of intent messages, explicit intent messages and implicit intent messages.

Explicit intent message: the intent message that explicitly indicates the name of a target program component is called as an explicit intent message. For example, A program component needs to send an intent message of "call 18688888888", and if A program component wants B program component to respond to the intent message, A program component specifies that the target program component is B program component, after receiving this intent message, the Android operating system passes this intent message to the B program component for processing.

Implicit intent message: the intent message that does not explicitly indicate the name of the target program component is called as an implicit intent message. For example, A component needs to send an intent message of "call 18688888888", and if A component does not know which program component should be responded to this intent message, A component may not specify a target program component in the intent message, after receiving this intent message, the Android operating system checks the type of this intent message monitored by each program component in advance. If B program component is monitoring the intent message related to the phone call, the Android operating system passes the intent message to the B program component to process. Alternatively, the Android operating system may broadcast the intent message, and it is received and processed by a Broadcast Receiver component which is interested in the intent message related to the phone call.

System User Interface (UI) components: the component responsible for interacting with users in the Android operating system, which provides a visual user interface for the Android operating system.

Figure 4A:
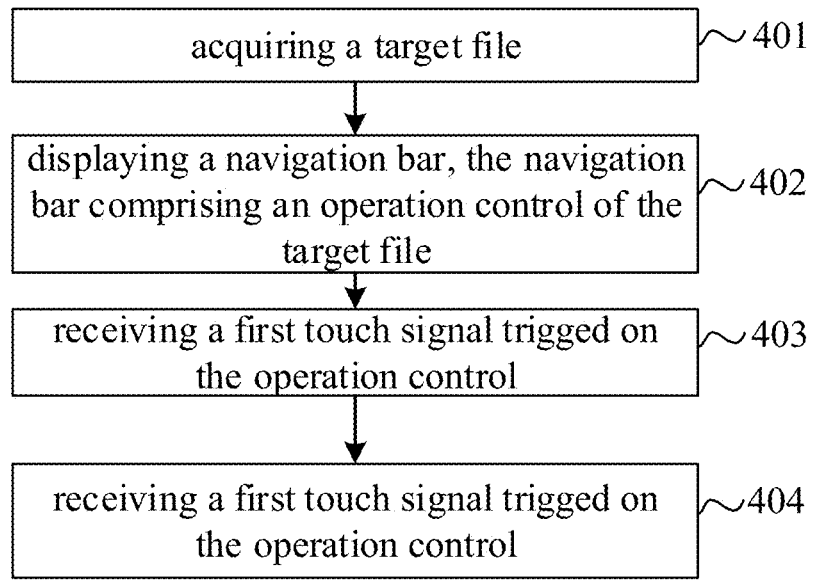
FIG. 4A is a schematic flowchart of an information display method according to an embodiment of the disclosure.

As illustrated in FIG. 4A, it is a schematic flowchart of an information display method according to an embodiment of the disclosure. The information display method can be applied to the terminal 100 provided in the above figures, and the method includes the follows.

Step 401, a terminal acquires a target file.

Optionally, the target file may be a file in any format of multiple formats, such as an image, a video, an audio, a compressed file, a web page file, and the like.

When the target file is an image, the terminal can obtain the image by taking a screenshot operation, a shooting operation, or a downloading operation. When the target file is an audio file, the terminal can obtain the audio file through a recording operation or a downloading operation. When the target file is a file in other various formats, such as a compressed file or a web page file, the terminal can obtain the target file by a downloading operation, a short-distance transmitting operation, and the like. The embodiments of the disclosure do not limit the manner of acquiring the target file in various formats.

Figure 4B:
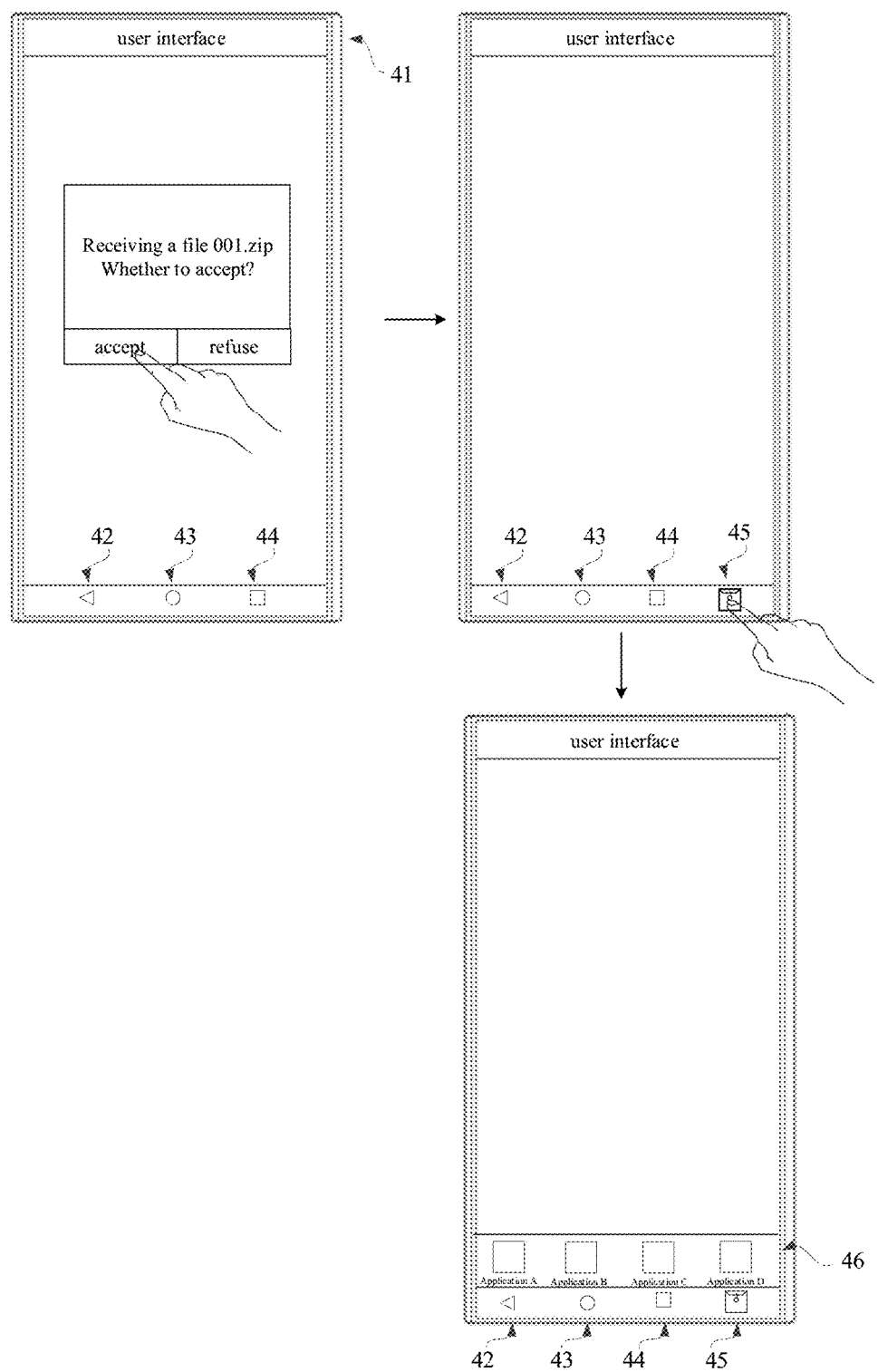
FIG. 4B is a schematic diagram showing user interfaces of the information display method according to the embodiment of the disclosure.

Illustratively, taking the target file is a compressed file as an example, as illustrated in FIG. 4B, a prompt box is displayed in a user interface 41, a navigation bar is displayed at a lower portion of the user interface. The navigation bar includes three virtual buttons, Back button 42, Home button 43, and Menu button 44. The user can click "Accept" to obtain the target file, i.e., the file 001.zip.

Step 402, a navigation bar, including an operation control of the target file, is displayed.

Optionally, a thumbnail of the target file, or a preset icon, or a file name of the target file may be displayed on the operation control of the target file. It is not limited in the embodiment of the disclosure. Optionally, on the basis of at least one virtual button that has been displayed on the navigation bar, the terminal adds the operation control of the target file to be displayed on the navigation bar.

Schematically, as shown in FIG. 4B, after receiving the file 001.zip on the user interface 41, the terminal adds the operation control 45 of the file 001.zip to be displayed on the navigation bar, and a preset icon is displayed on the operation control 45. In this embodiment, the operation control 45 of the target file is added and displayed on the right side of the Menu button 44 as an example. In actual operations, the operation control 45 may also be displayed between the Back button 42 and the Home button 43, or between the Home button 43 and the Menu button 44, or at the left side of the Back button 42.

In addition, the navigation bar may include three virtual buttons, and may also include more or less virtual buttons. The embodiment of the present application does not limit the arrangement order between the added displayed operation control and the original virtual buttons.

Step 403, a first touch signal triggered on the operation control is received.

The user can perform one or more operations such as clicking, double-clicking, long-pressing, sliding, and the like, on the operation control displayed on the touch screen. The operation applied by the user on the touch screen can trigger the corresponding first touch signal, and the terminal can receive the first touch signal by operating on the operation control.

Schematically, as shown in FIG. 4B, the user clicks on the operation control 45 of the target file in the navigation bar, and the click operation on the touch screen triggers the corresponding first touch signal, and the terminal receives the first touch signal by operating on the operation control 45.

Step 404, a program entry of at least one application is displayed according to the first touch signal.

The at least one application is used to process the above target file. Optionally, the at least one application has one or more capabilities of sharing the target file, editing the target file, decompressing the target file, opening the target file, playing the target file, and identifying a graphic code in the target file, and the like, which are not limited in the embodiments of the present application.

Optionally, the program entry of the at least one application can be performed by moving the navigation bar upward from the original display position, displaying a virtual operation bar at the original display position of the navigation bar, and displaying the program entry of the at least one application at the virtual operation bar. The virtual operation bar is a stripe-shaped control bar, having the same length as the navigation bar, and the virtual operation bar is a display area configured for displaying the program entry of the at least one application. Optionally, the virtual operation bar may be implemented by using the codes of NavigationBar, may be implemented by using the codes of ActionBar, and may also be implemented by using the codes of ShareBar, which are not limited in the embodiments of the present application.

Optionally, the program entry of the at least one application may be displayed by directly adding and displaying the virtual operation bar upper the navigation bar, and displaying the program entry of the at least one application on the virtual operation bar.

Optionally, the program entry of the at least one application may be displayed by superimposing and displaying the virtual operation bar in a central position of the user interface, and displaying the program entry of the at least one application on the virtual operation bar.

Schematically, as shown in FIG. 4B, after the user triggers the first touch signal on the operation control 45 of the file 001.zip, the virtual operation bar 46 is displayed at the upper of the navigation bar and close to the navigation bar, according to the first touch signal. The virtual operation bar 46 shows program entries of the application A, the application B, the application C, and the application D, and the application A, the application B, the application C, and the application D are used to process the file 001.zip.

In summary, by adding and displaying the operation control of the target file in the navigation bar, and displaying the program entry of at least one application after triggering a first touch signal on the operation control, the at least one application is used to process the target file, thus the number of steps of operating the target file by a target application is reduced, the difficulty for the user to operate a mobile terminal with one hand is decreased, the functions of the navigation bar are improved, thereby improving the efficiency of human-computer interaction.

Figure 5A:
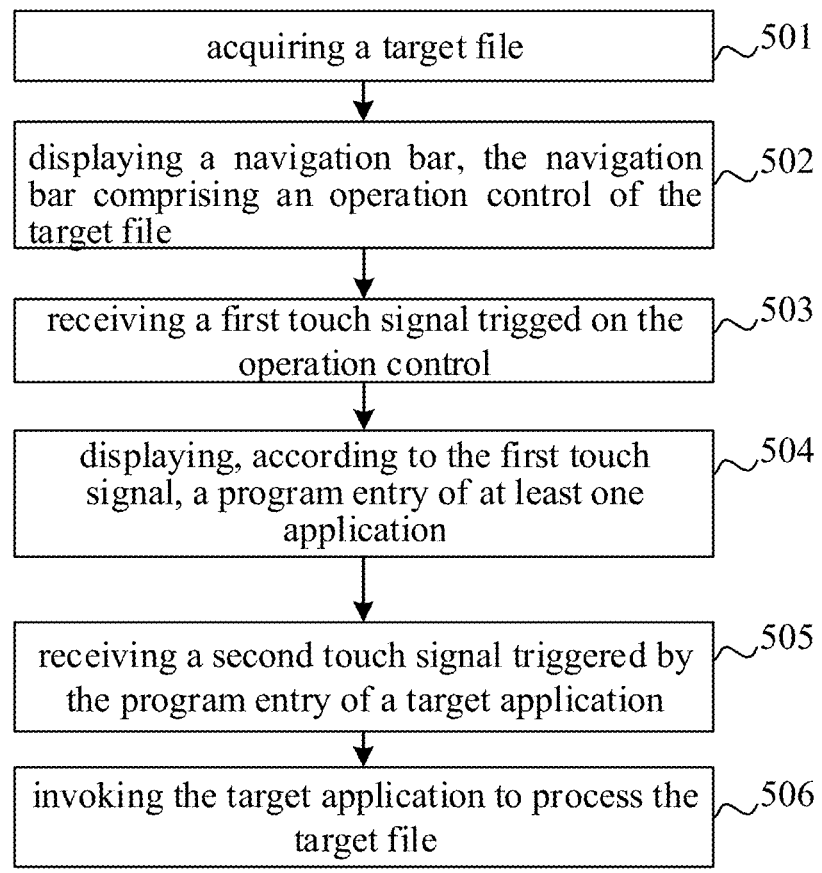
FIG. 5A is a schematic flowchart of an information display method according to another embodiment of the disclosure.

In an optional embodiment, by triggering a second touch signal on a target application in at least one application, the target application may be called to process the target file. FIG. 5A is a flowchart of an information display method provided by another exemplary embodiment of the present application. As illustrated in FIG. 5, the method includes the follows.

Step 501, a terminal acquires a target file.

Optionally, the target file may be a file in any format of multiple formats, such as an image, a video, an audio, a compressed file, a web page file, and the like.

When the target file is an image, the terminal can obtain the image by taking a screenshot operation, a shooting operation, or a downloading operation. When the target file is an audio file, the terminal can obtain the audio file through a recording operation or a downloading operation. When the target file is a file in other various formats, such as a compressed file or a web page file, the terminal can obtain the target file by a downloading operation, a short-distance transmitting operation, and the like. The embodiments of the disclosure do not limit the manner of acquiring the target file in various formats.

Figure 5B:
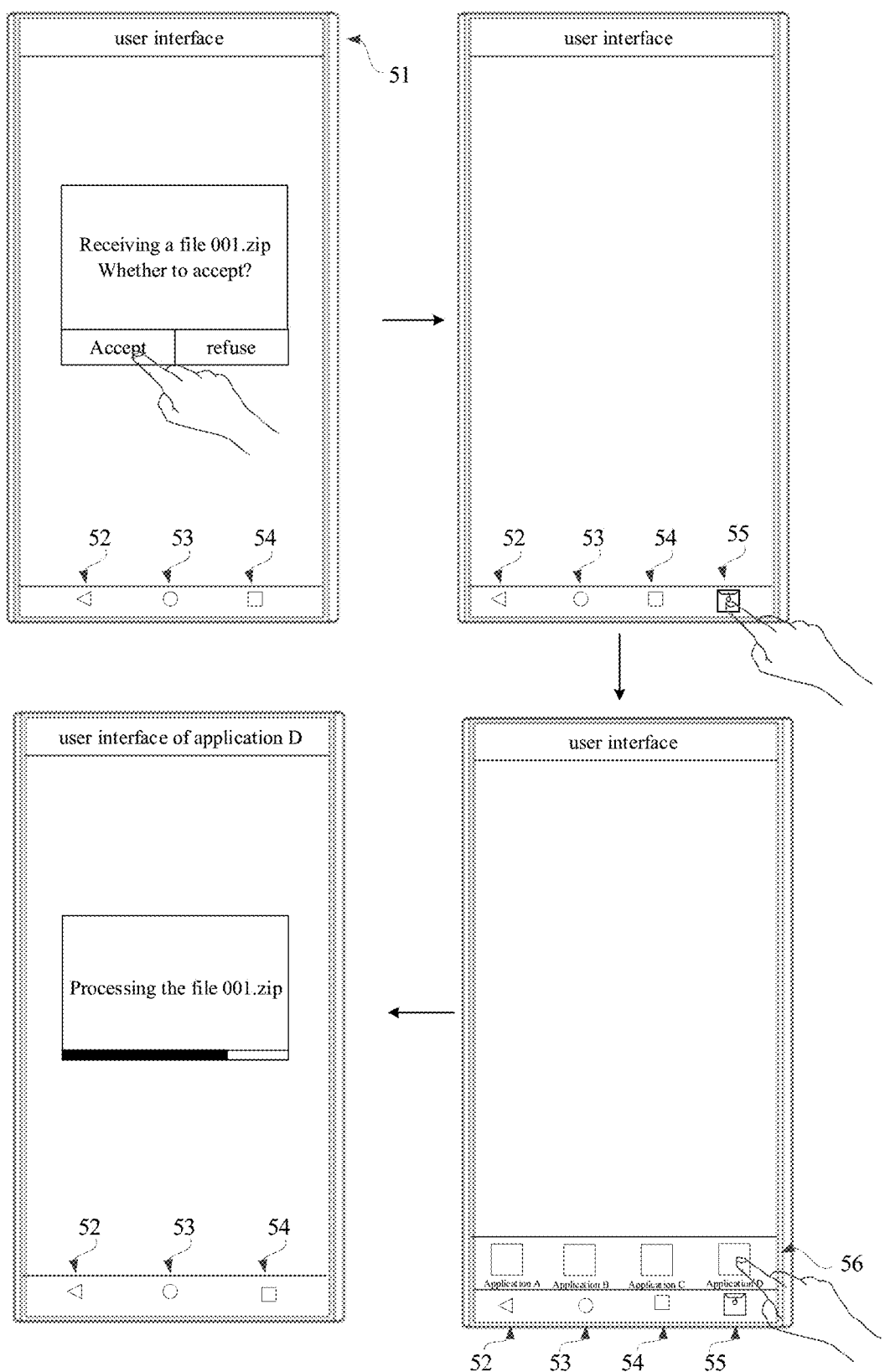
FIG. 5B is a schematic diagram showing user interfaces of the information display method according to the embodiment of the disclosure.

Illustratively, taking the target file is a compressed file as an example, as illustrated in FIG. 5B, a prompt box is displayed in a user interface 51, a navigation bar is displayed at a lower portion of the user interface. The navigation bar includes three virtual buttons, Back button 52, Home button 53, and Menu button 54. The user can click "Accept" to obtain the target file, i.e., the file 001.zip.

Step 502, a navigation bar, including an operation control of the target file, is displayed.

Optionally, a thumbnail of the target file, or a preset icon, or a file name of the target file may be displayed on the operation control of the target file. It is not limited in the embodiment of the disclosure.

Schematically, as shown in FIG. 5B, after receiving the file 001.zip on the user interface 51, the terminal displays the navigation bar on the display screen, the navigation bar includes the operation control 55 of the file 001.zip, and a preset icon is displayed on the operation control 55. In this embodiment, the operation control 55 of the target file is added and displayed on the right side of the Menu button 54 as an example. In actual operations, the operation control 55 may also be displayed between the Back button 52 and the Home button 53, or between the Home button 53 and the Menu button 54, or at the left side of the Back button 52.

In addition, the navigation bar may include three virtual buttons, and may also include more or less virtual buttons.

The embodiment of the present application does not limit the arrangement order between the added displayed operation control and the original virtual buttons.

Step 503, a first touch signal triggered on the operation control is received.

The user can perform one or more operations such as clicking, double-clicking, long-pressing, sliding, and the like, on the operation control displayed on the touch screen. The operation applied by the user on the touch screen can trigger the corresponding first touch signal, and the terminal can receive the first touch signal by operating on the operation control.

Schematically, as shown in FIG. 5B, the user clicks on the operation control 55 of the target file in the navigation bar, and the click operation on the touch screen triggers the corresponding first touch signal, and the terminal receives the first touch signal by operating on the operation control 55.

Step 504, a program entry of at least one application is displayed according to the first touch signal.

The at least one application is used to process the above target file. Optionally, the at least one application has one or more capabilities of sharing the target file, editing the target file, decompressing the target file, opening the target file, playing the target file, and identifying a graphic code in the target file, and the like, which are not limited in the embodiments of the present application.

Optionally, the program entry of the at least one application can be displayed by moving the navigation bar upward from the original display position, displaying a virtual operation bar at the original display position of the navigation bar, and displaying the program entry of the at least one application at the virtual operation bar.

Optionally, the program entry of the at least one application may be displayed by directly adding and displaying the virtual operation bar upper the navigation bar, and displaying the program entry of the at least one application on the virtual operation bar.

Optionally, the program entry of the at least one application may be displayed by superimposing and displaying the virtual operation bar in a central position of the user interface, and displaying the program entry of the at least one application on the virtual operation bar.

Schematically, as shown in FIG. 5B, after the user triggers the first touch signal on the operation control 55 of the file 001.zip, the virtual operation bar 56 is displayed at the upper of the navigation bar and close to the navigation bar, according to the first touch signal. The virtual operation bar 56 shows program entries of the application A, the application B, the application C, and the application D, and the application A, the application B, the application C, and the application D are used to process the file 001.zip.

Step 505, a second touch signal triggered on the program entry of a target application is received.

The user can perform an operation such as clicking, double-clicking, long-pressing, sliding, and the like, on the program entry of the target application displayed on the touch screen by the user. Operation control is displayed on the touch screen. The operation applied by the user on the touch screen can trigger the corresponding second touch signal, and the terminal can receive the second touch signal by operating on the program entry. The target application is an application selected by the second touch signal among the at least one application displayed on the virtual operation bar.

Schematically, as shown in FIG. 5B, the user clicks on the program entry of the application D below the navigation bar, and the click operation on the touch screen triggers the corresponding second touch signal, and the terminal receives the second touch signal by operating on the program entry of the application D.

Step 506, the target application is invoked to process the target file.

Optionally, when the target file is an image, the target application is invoked to perform at least one processing of sharing, opening, beautifying, cropping, printing, transmitting, and saving the image; when the target file is an audio or a video, the target application is invoked to perform at least one processing of sharing, playing, editing, intercepting, transferring, and saving the target file; when the target file is a compressed file or a web page file, the target application is invoked to perform at least one processing of sharing, transmitting, and saving the target file.

Schematically, as shown in FIG. 5B, after the user clicks on the program entry of the application D below the navigation bar, the terminal receives the second touch signal by operating on the program entry of the application D, and invokes the application D to process the file 001.zip and displays the user interface of the application D. The navigation bar is restored to the navigation bar before displaying the operation control of the file 001.zip, that is, the navigation bar just includes the Back button 52, the Home button 53, and the Menu button 54. The navigation bar is restored to the navigation bar before the operation control of the file 001.zip is added, that is, the navigation bar includes only the return key 52, the home key 53 and the menu key 54.

In the above embodiment, the target application is invoked to process the target file and the user interface of the target application is displayed as an example for description. In an optional embodiment, the processing of the target file (file 001.zip) can be performed in the background without displaying the user interface of the target application (i.e., the application D), and the processing does not affect the normal usage of the original user interface.

In the above embodiment, the target application is invoked to process the target file and the navigation bar is restored to the navigation bar before displaying the operation control of the target file, as an example. In an alternative embodiment, when the target application is processing the target file, the navigation bar may maintain the state of displaying the operation control of the target file.

In summary, by adding and displaying the operation control of the target file in the navigation bar, and displaying the program entry of at least one application after triggering a first touch signal on the operation control, the at least one application is used to process the target file, thus the number of steps of operating the target file by a target application is reduced, the difficulty for the user to operate a mobile terminal with one hand is decreased, the function of the navigation bar improved, thereby improving the efficiency of human-computer interaction.

Figure 6A:
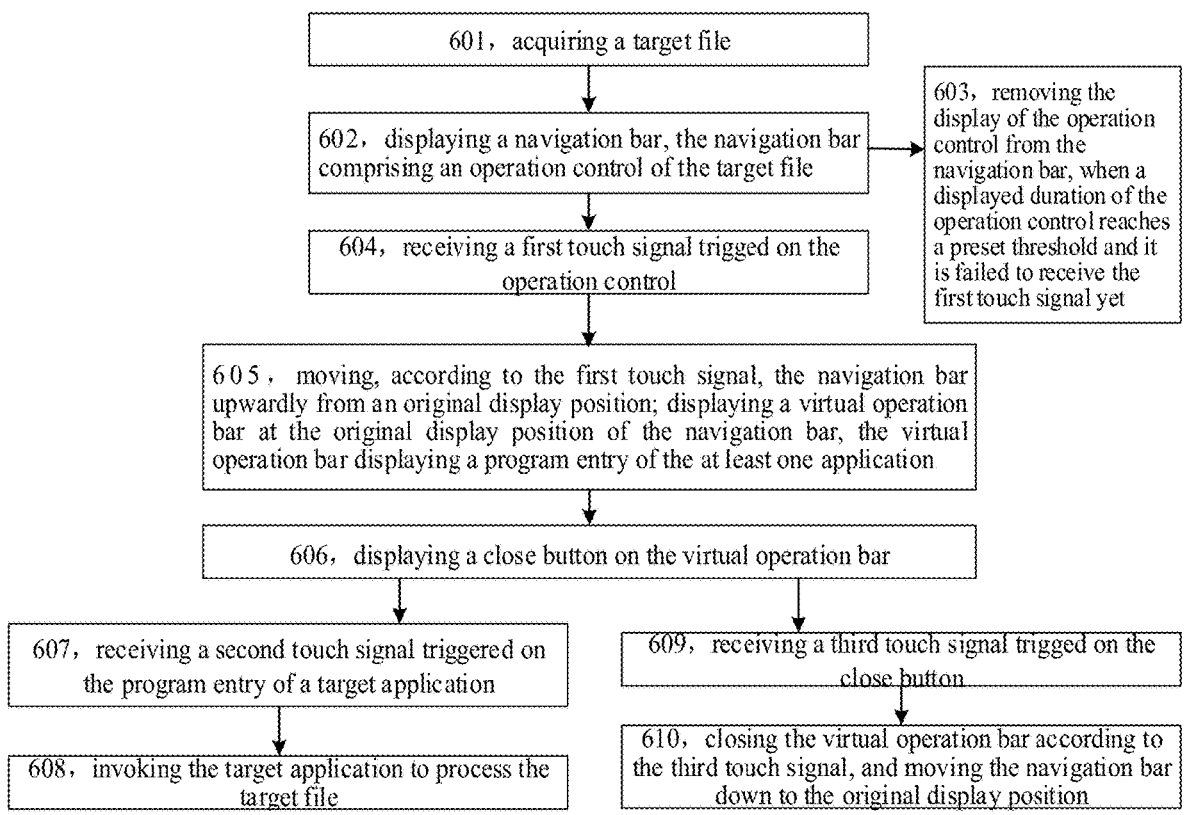
FIG. 6A is a schematic flowchart of an information display method according to still another embodiment of the disclosure.

As illustrated in FIG. 6A, it is a schematic flowchart of an information display method according to still another embodiment of the disclosure. The information display method can be applied to the terminal 100 provided in the above figures, and the method includes the follows.

Step 601, a terminal acquires a target file.

Optionally, the target file may be a file in any format of multiple formats, such as an image, a video, an audio, a compressed file, a web page file, and the like.

When the target file is an image, the terminal can obtain the image by taking a screenshot operation, a shooting operation, or a downloading operation. When the target file is an audio file, the terminal can obtain the audio file through a recording operation or a downloading operation. When the target file is a file in other various formats, such as a compressed file or a web page file, the terminal can obtain the target file by a downloading operation, a short-distance transmitting operation, and the like. The embodiments of the disclosure do not limit the manner of acquiring the target file in various formats.

Figure 6B:
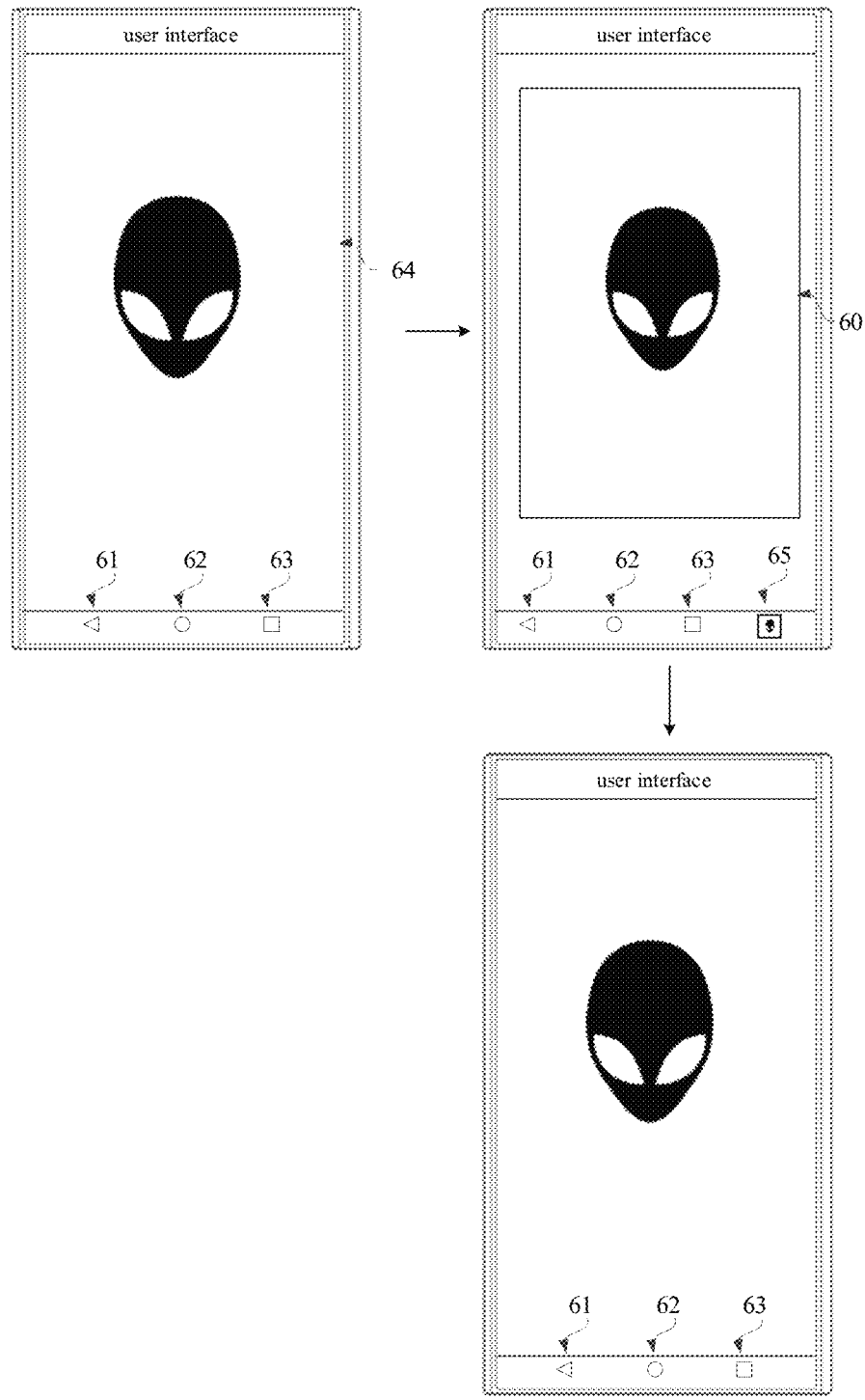
FIG. 6B to FIG. 6D are schematic diagrams showing user interfaces of the information display method according to the embodiment of the disclosure.

Illustratively, taking the target file is an image and the image is obtained by a screenshot operation as an example, as illustrated in FIG. 6B, a navigation bar is displayed in a lower portion of the user interface 64; the navigation bar includes three virtual buttons, Back button 61, Home button 62, and Menu button 63; the user inter face 64. The user can use user interface 64 to perform the screenshot operation, and a screenshot image is obtained by the screenshot operation.

Step 602, a navigation bar, including an operation control of the target file, is displayed.

The terminal displays the navigation bar on the display screen through the system UI component, and displays the operation control of the target file on the navigation bar through the system UI component. When the target file is an image, the system UI component can also generate a thumbnail of the image and display it in the navigation bar; or the system UI component can also display a preset icon of the target file in the navigation bar; or the system UI component can also display the text used to represent the target file in the navigation bar.

Schematically, as shown in FIG. 6B, after performing the screenshot operation on the user interface 64, the terminal adds the operation control 65 for displaying a screen shot image in the navigation bar, and the operation control 65 displays a thumbnail of the screen shot image 60. In this embodiment, the operation control 65 of the target file is added and displayed on the right side of the Menu button 63 as an example. In actual operations, the operation control 65 may also be displayed between the Back button 61 and the Home button 62, or between the Home button 62 and the Menu button 63, or at the left side of the Back button 61. In addition, the navigation bar may include three virtual buttons, and may also include more or less virtual buttons. The embodiment of the present application does not limit the arrangement order between the operation control and the original virtual buttons.

Step 603, when a displayed duration of the operation control reaches a preset threshold and no first touch signal is received, the operation control is removed and does not displayed in the navigation bar.

Schematically, as shown in FIG. 6B, if the preset threshold is 6 seconds, when the displayed duration of the operation control 65 reaches the preset threshold, that is, 6 seconds, and the terminal does not receive the first touch signal, the display of the operation control 65 is removed from the navigation bar. In actual operations, the preset threshold of the displayed duration can be set by the developer or set by the user.

Step 604, the first touch signal triggered on the operation control is received.

The user can perform one or more operations such as clicking, double-clicking, long-pressing, sliding, and the like, on the operation control displayed on the touch screen. The operation applied by the user on the touch screen can trigger the corresponding first touch signal, and the terminal can receive the first touch signal by operating on the operation control.

Figure 6C:
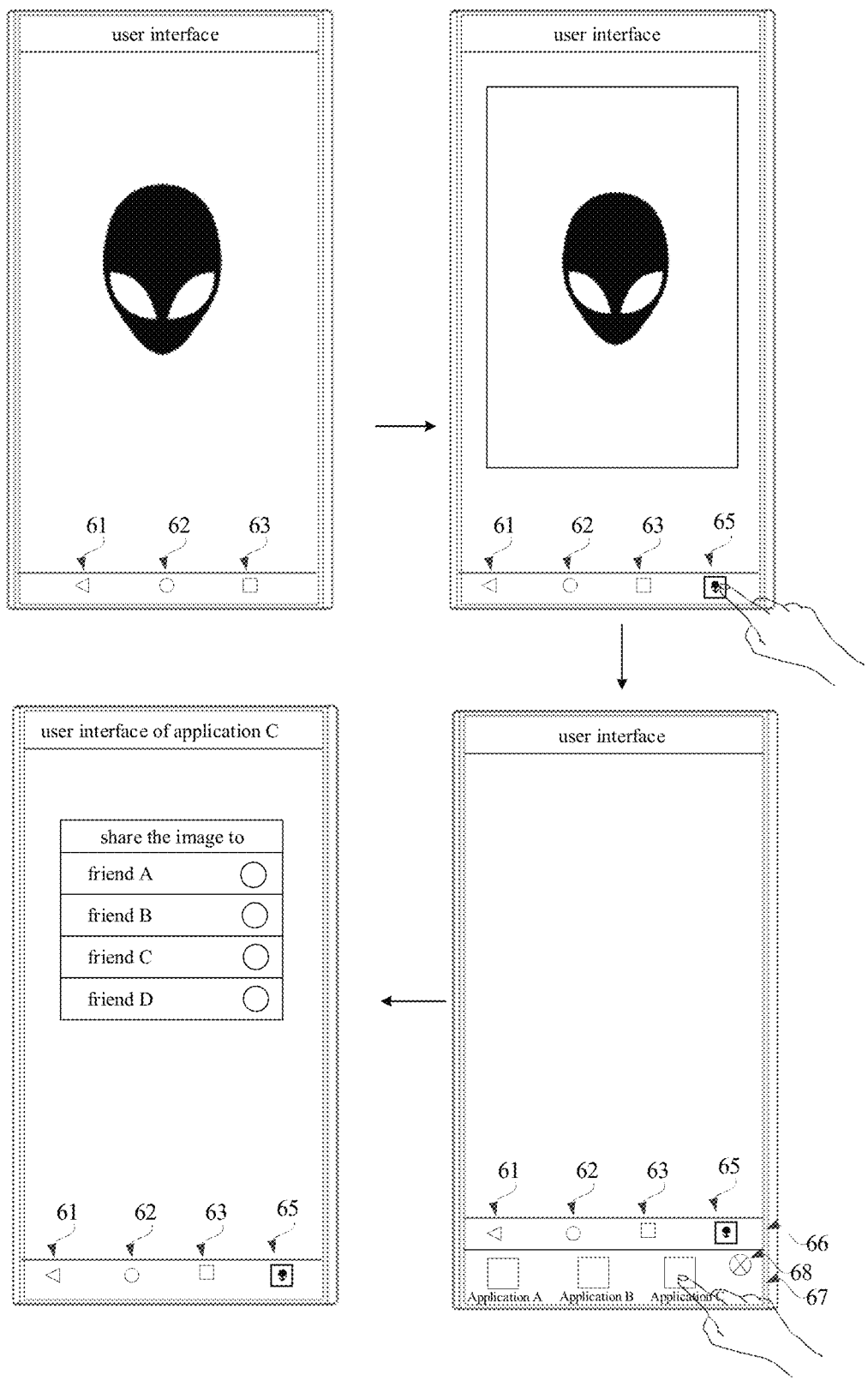

Schematically, as shown in FIG. 6C, the user clicks on the operation control 65 of the target file in the navigation bar, and the click operation on the touch screen triggers the corresponding first touch signal, and the terminal receives the first touch signal by operating on the operation control 65.

Step 605, the navigation bar is moved upwardly from the original display position according to the first touch signal, a virtual operation bar is displayed at the original display position of the navigation bar, the virtual operation bar displays a program entry of at least one application.

The virtual operation bar can be displayed on the display screen through a system UI component, and the virtual operation bar includes the program entry of the at least one application. The at least one application has capabilities of processing the target file. Optionally, the at least one application has one or more capabilities of sharing the target file, editing the target file, decompressing the target file, opening the target file, playing the target file, and identifying a graphic code in the target file, and the like, which are not limited in the embodiments of the present application.

During the installing of the applications of the Android operating system, the Content Provider component is configured with data formats that can be processed and the data formats that the application can process are stored in the operating system, that is, the operating system may store the data format that each application can process data thereof.

The terminal generates an Intent message according to the first touch signal. The Intent message includes the data format of the target file. The operating system matches the intent message to obtain the application that can process the data in such data format. Through the system UI component, the program entry of the at least one application capable of processing the data in such data format is displayed in the virtual operation bar.

Optionally, if there is a default application which is capable of processing the target file and is not necessary for the user to select in the program entry of the at least one application, the target file may be processed by the default application. When the terminal receives the first touch signal triggered on the operation control, the default application is called to process the target file.

Schematically, as shown in FIG. 6C, after the user clicks the operation control 65 of the target file in the navigation bar 66, the navigation bar 66 is moved upwardly from the original display position and the virtual operation bar 67 is displayed on the original display position of the navigation bar 66. The virtual operation bar 67 displays program entries of three applications, which are the program entry of the application A, the program entry of the application B, and the program entry of the application C, respectively. The above applications A, B and C each have the ability to process the screenshot image.

Step 606, a close button is displayed on the virtual operation bar.

The terminal displays the close button on the virtual operation bar through the system UI component of the operating system. The close button is for closing the display of the virtual operation bar and restoring the navigation bar to the original display position, as illustrated schematically in FIG. 6C, a close button 68 is displayed in an upper right corner of the virtual operation bar 67. In actual operations, the close button can be displayed any of the upper right corner, the upper left corner, the lower right corner, the lower left corner, the left side, or the right side of the virtual operation bar. The position of the close button can be set by the developer or the user.

Step 607, a second touch signal triggered on the program entry of a target application is received.

The user can perform an operation such as clicking, double-clicking, long-pressing, sliding, and the like, on the program entry of the target application displayed on the touch screen by the user. Operation control is displayed on the touch screen. The operation applied by the user on the touch screen can trigger the corresponding second touch signal, and the terminal can receive the second touch signal by operating on the program entry. The target application is an application selected by the second touch signal among the at least one application displayed on the virtual operation bar.

Schematically, as shown in FIG. 6C, the user clicks on the program entry of the application C below the navigation bar, and the click operation on the touch screen triggers the corresponding second touch signal, and the terminal receives the second touch signal by operating on the program entry of the application C.

Step 608, the target application is invoked to process the target file.

Optionally, when the target file is an image, the target application is invoked to perform at least one processing of sharing, opening, beautifying, cropping, printing, transmitting, and saving the image; when the target file is an audio or a video, the target application is invoked to perform at least one processing of sharing, playing, editing, intercepting, transferring, and saving the target file; when the target file is a compressed file or a web page file, the target application is invoked to perform at least one processing of sharing, transmitting, and saving the target file.

Schematically, as shown in FIG. 6C, after the user clicks on the program entry of the application C below the navigation bar, the terminal receives the second touch signal on the program entry of the application C, calls the application C to share the image, and thus a user interface of the application C is displayed. The user can select a target friend who wants to share the image on the user interface. The navigation bar maintains the state of displaying the operation control of the screenshot image, that is, the navigation bar just includes the Back button 61, the Home button 62, the Menu button 63, and the operation control 65 of the screenshot image.

The above embodiment takes calling the target application to process the target file and displaying the user interface of the target application as an example for description. In alternative embodiments, the sharing of the target file, i.e., the screenshot image, can be performed in the current user interface, without displaying the user interface of the target application (i.e., the application C).

Step 609, a third touch signal triggered on the close button is received.

The user can perform one or more operations on the close button displayed on the touch screen, such as clicking, double-clicking, long-pressing, and swiping. The operation applied by the user on the touch screen can trigger the corresponding third touch signal, and the terminal can receive the third touch signal by operating on the close button.

Figure 6D:
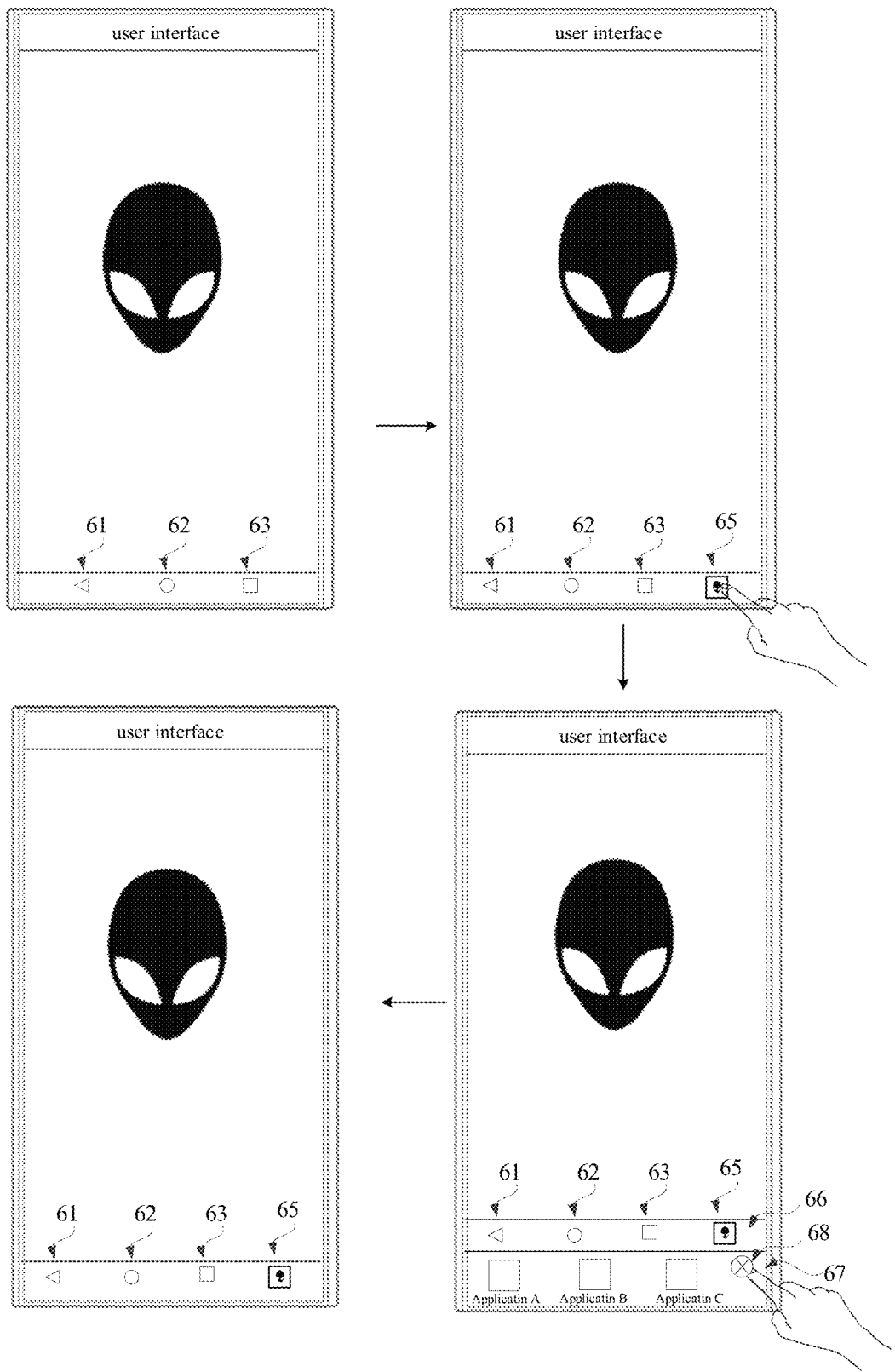

Schematically, as shown in FIG. 6D, the user clicks the close button on the virtual operation bar. The click operation on the touch screen triggers the corresponding third touch signal, and the terminal receives the third touch signal on the close button.

Step 610, the virtual operation bar is closed according to the third touch signal, and the navigation bar is moved downwardly to the original display position.

In this step, closing the virtual operation bar does not affect the normal running of the applications, that is, the applications can run normally and continuously.

Schematically, as shown in FIG. 6D, the terminal closes the virtual operation bar 67 according to the third touch signal, and moves the navigation bar 66 downwardly until to the original display position.

The above embodiment takes moving the navigation bar down to the original display position after closing the virtual operation bar as an example for description. In alternative embodiments, if the virtual operation bar is displayed above the navigation bar, at a central position of the user interface, or any other position, after triggering the third touch signal on the close button, the display of the virtual operation bar can be directly closed without affecting the normal operation of the applications.

It is worth noting that the above steps 607-608 and the above steps 609-610 are two parallel processing methods for processing the virtual operation bar in this embodiment, it may be just the steps 607-608 is performed, or just the steps 609-610 is performed.

In summary, by adding and displaying the operation control of the target file in the navigation bar, and displaying the program entry of at least one application after triggering a first touch signal on the operation control, the functions of the navigation bar is increased, the number of steps of operating the target file by the target application is reduced. Also, by displaying the close button on the virtual operation bar, and closing the virtual operation bar by touching the close button when there is no target application that the user wants to select among the candidate applications displayed in the virtual action bar, so it is avoided to obstruct the user interface by the virtual operation bar long, and the operability of the virtual operation bar is improved.

Figure 7:
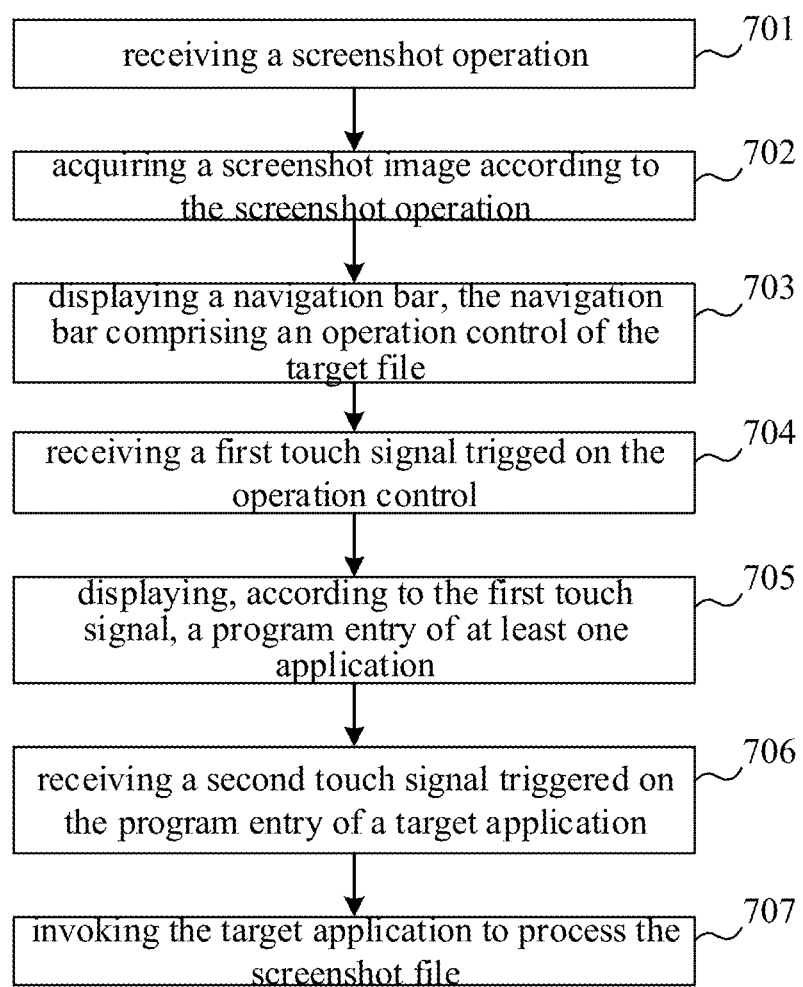
FIG. 7 is a schematic flowchart of an information display method according to still another embodiment of the disclosure.

FIG. 7 is a flowchart of an information display method provided by still another exemplary embodiment of the disclosure, taking the target file described in the foregoing embodiment is a screenshot image as an example for description. As illustrated in FIG. 7, the method includes the following:

Step 701, the terminal receives a screenshot operation.

The screenshot operation is used to capture the current user interface. Optionally, the screenshot operation can be used to capture the whole current user interface, or to capture a portion of the current user interface.

Schematically, with reference to FIG. 6B, the user captures the whole current user interface 64, and the terminal receives the screenshot operation.

Step 702, the terminal obtains a screenshot image according to the screenshot operation.

Optionally, the screenshot operation can capture the whole current user interface, or a portion of the current user interface.

Schematically, it can be known with reference to FIG. 6B that the terminal obtains a screenshot image 60 according to the screenshot operation, and the screenshot image is a screenshot image obtained by performing a screenshot operation on the whole of the current user interface 64.

Step 703, the terminal further displays an operation control of the screenshot image in the navigation bar.

Schematically, it can be known with reference to FIG. 6B that a thumbnail image of the screenshot image 60 is displayed on the operation control 65 of the screenshot image. In an optional embodiment, a preset icon may be displayed on the operation control 65 of the screenshot image, text information used to represent the screenshot image may also be displayed on the operation control 65 of the screenshot image.

Step 704, the terminal receives a first touch signal triggered on the operation control.

The user can perform one or more operations such as clicking, double-clicking, long-pressing, sliding, and the like, on the operation control displayed on the touch screen. The operation applied by the user on the touch screen can trigger the corresponding first touch signal, and the terminal can receive the first touch signal by operating on the operation control.

Schematically, as shown in FIG. 6C, the user clicks on the operation control 65 of the screenshot image in the navigation bar, and the click operation on the touch screen triggers the corresponding first touch signal, and the terminal receives the first touch signal by operating on the operation control 65.

Step 705, the terminal displays a program entry of at least one application according to the first touch signal.

The at least one application has the capability of processing the above screenshot image. Optionally, the at least one application has the capability of at least one of sharing, opening, beautifying, cropping, printing, transmitting, and saving the screenshot image, which is not limited in the embodiment of the present application.

Optionally, the program entry of the at least one application can be displayed by moving the navigation bar upward from the original display position, displaying a virtual operation bar at the original display position of the navigation bar, and displaying the program entry of the at least one application at the virtual operation bar; may by directly adding and displaying the virtual operation bar upper the navigation bar, and displaying the program entry of the at least one application on the virtual operation bar; may by superimposing and displaying the virtual operation bar in a central position of the user interface, and displaying the program entry of the at least one application on the virtual operation bar.

Schematically, as shown in FIG. 6C, after the user clicks the operation control 65 of the target file in the navigation bar 66, the navigation bar 66 is moved upwardly from the original display position and the virtual operation bar 67 is displayed on the original display position of the navigation bar 66. The virtual operation bar 67 displays program entries of three applications, which are the program entry of the application A, the program entry of the application B, and the program entry of the application C, respectively. The above applications A, B and C each have the ability to process the screenshot image.

Step 706, the terminal receives a second touch signal triggered on the program entry of a target application.

The user can perform an operation such as clicking, double-clicking, long-pressing, swiping, and the like, on the program entry of the target application displayed on the touch screen by the user. Operation control is displayed on the touch screen. The operation applied by the user on the touch screen can trigger the corresponding second touch signal, and the terminal can receive the second touch signal by operating on the program entry. The target application is an application selected by the second touch signal among the at least one application displayed on the virtual operation bar.

Schematically, as shown in FIG. 6C, the user clicks on the program entry of the application C below the navigation bar, and the click operation on the touch screen triggers the corresponding second touch signal, and the terminal receives the second touch signal by operating on the program entry of the application C.

Step 707, the terminal invokes the target application to process the screenshot image.

Optionally, the target application is invoked to perform at least one processing of sharing, opening, beautifying, cropping, printing, transmitting, and saving the screenshot image.

Schematically, as shown in FIG. 6C, after the user clicks on the program entry of the application C below the navigation bar, the terminal receives the second touch signal on the program entry of the application C, calls the application C to share the image, and thus a user interface of the application C is displayed. The user can select a target friend who wants to share the image on the user interface. The navigation bar maintains the state of displaying the operation control of the screenshot image, that is, the navigation bar just includes the Back button 61, the Home button 62, the Menu button 63, and the operation control 65 of the screenshot image.

In summary, by adding and displaying the operation control of the screenshot image in the navigation bar after obtaining the screenshot image, and displaying the program entry of at least one application after receiving a first touch signal on the operation control, the screenshot image is processed by a target application, thus the number of steps of operating the screenshot image by the target application is reduced, and the function of the navigation bar improved.

Figure 8A:
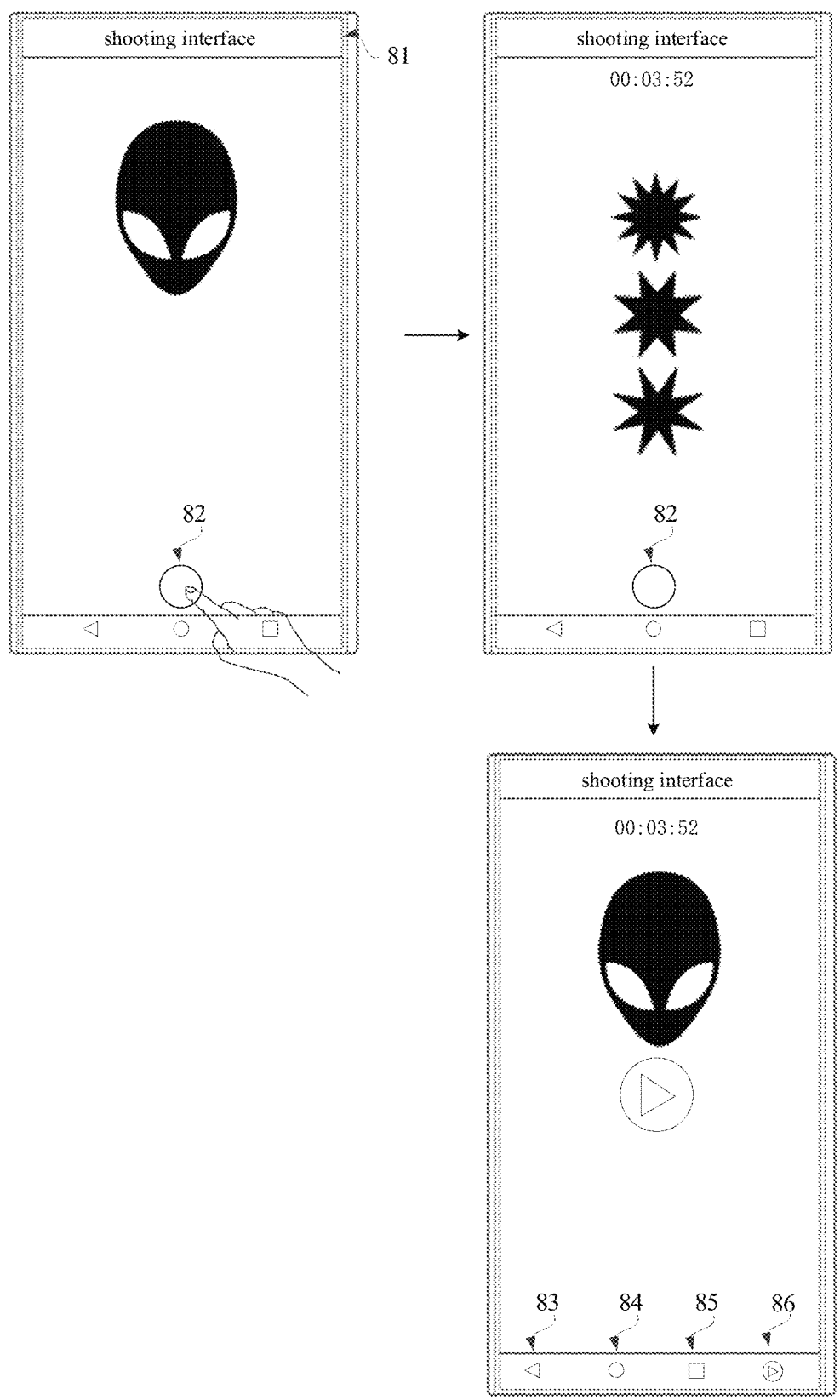
FIG. 8A to FIG. 8B are schematic diagrams showing user interfaces of the information display method according to the embodiment of the disclosure.
Figure 8B:
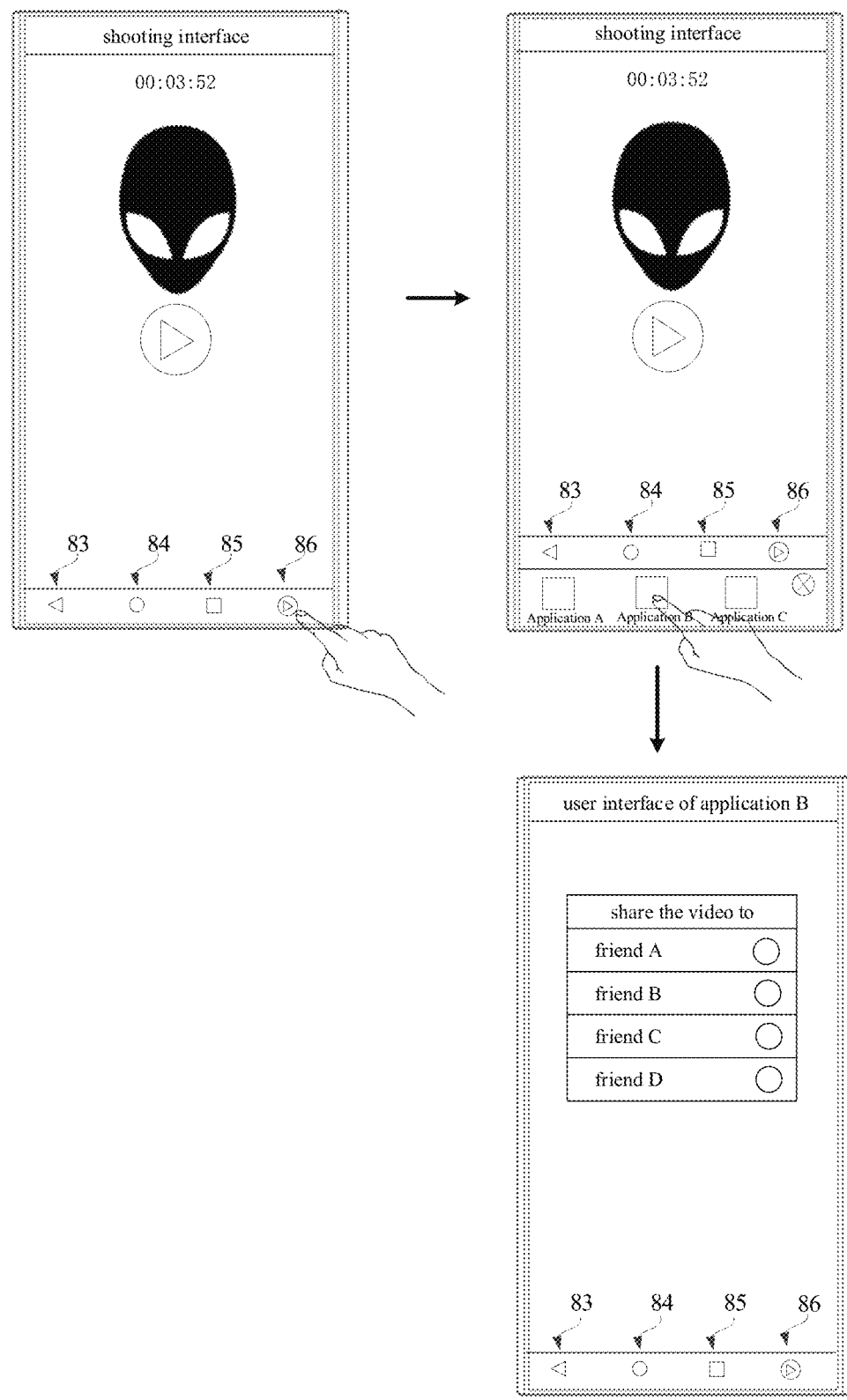

FIGS. 8A to 8B are schematic diagrams showing interfaces of an information display method provided by still another exemplary embodiment of the disclosure, taking the target file described in the foregoing embodiment is a video file as an example for description.

Illustratively, as shown in FIG. 8A, a shooting interface 81 is a user interface for taking a photo or a video. The shooting interface 81 includes a virtual button 82 for shooting a video. When a touch operation is performed on the virtual button 82 for video shooting, the terminal acquires frames of the video collected by a camera; when the shooting duration reaches a user expected duration, a touch operation is performed again on the virtual button 82 to end the video shooting. As shown in FIG. 8A, when the shooting duration reaches 3 minutes 52 seconds, the user performs a touch operation again on the virtual button 82 to end the shooting; the terminal acquires the captured video file, and displays an operation control 87 of the video file in the navigation bar. The operation control 87 displays a preset icon for representing video files.

In this embodiment, the operation control 86 of the video file is added and displayed on the right side of the Menu button 84 as an example. In actual operations, the operation control 86 may also be displayed between the Back button 83 and the Home button 84, or between the Home button 84 and the Menu button 85, or at the left side of the Back button 83. In addition, the navigation bar may include three virtual buttons, and may also include more or less virtual buttons. The embodiment of the present application does not limit the arrangement order between the added displayed operation control and the original virtual buttons.

As illustrated in FIG. 8B, after the user clicks the operation control 86, the navigation bar is moved upwardly from the original display position and the virtual operation bar is displayed on the original display position of the navigation bar. The virtual operation bar displays program entries of three applications, which are the program entry of the application A, the program entry of the application B, and the program entry of the application C, respectively. The above applications A, B and C each have the ability to process the video file.

As illustrated in FIG. 8B, after the user clicks on the program entry of the application B, the terminal calls the application B to process the video file, that is, the user can share the video file to at least one of friend A, friend B, friend C and the friend D via the application B.

It is worth noting that the video file in the above embodiments can also be implemented as an audio file; the method for processing the above video file and/or the audio file includes: sharing the video file and/or the audio file, or playing the video file and/or the audio file.

In summary, by adding and displaying the operation control of the audio file and/or video file in the navigation bar after obtaining the audio file and/or video file, and displaying the program entry of at least one application after receiving a first touch signal on the operation control, the audio file and/or video file is processed by a target application, thus the number of steps of operating the audio file and/or video file by the target application is reduced, and the function of the navigation bar improved.

The following are device embodiments of the disclosure. For the parts not described in detail in the device embodiments, please refer to the technical details disclosed in the above method embodiments.

Figure 9:
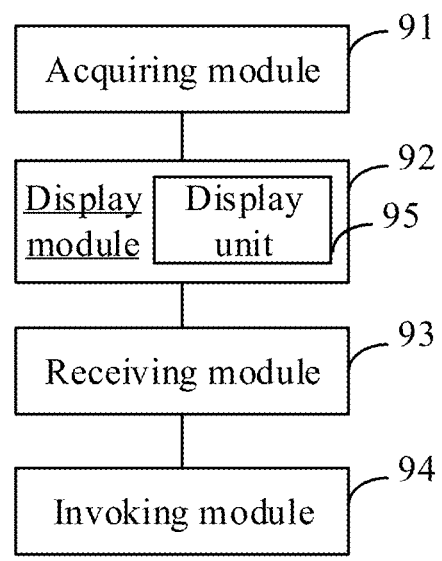
FIG. 9 is a structural block diagram of an information display device according to an embodiment of the disclosure.

Please refer to FIG. 9, which is a schematic structural diagram of an information display device according to an embodiment of the disclosure. The information display device can be formed as the whole or part of a terminal, through software, hardware, and a combination of the both. The information display device includes the follows.

An acquiring module 91 is configured to acquire a target file.

A display module 92 is configured to add the display of an operation control of the target file in a navigation bar.

A receiving module 93 is configured to receive a first touch signal triggered on the operation control.

The display module 92 is further configured to display a program entry of at least one application program according to the first touch signal, where the at least one application program has a capability of processing the target file.

The receiving module 93 is further configured to receive a second touch signal triggered on the program entry of a target application.

An invoking module 94 is configured to invoke the target application to process the target file.

In an optional embodiment, the display module 92 includes a display unit 95.

The display unit 95 is configured to add the display of the operation control of the target file in the navigation bar, and a thumbnail of the target file is displayed on the operation control.

In an optional embodiment, the display unit 95 is further configured to move the navigation bar from the original display position according to the first touch signal, display a virtual operation bar at the original display position of the navigation bar, and the virtual operation bar displays the program entry of the at least one application program.

In an optional embodiment, the display module 92 is further configured to display a close button on the virtual operation bar.

The receiving module 93 is further configured to receive a third touch signal triggered on the close button.

The display module 92 is further configured to close the virtual operation bar according to the third touch signal, and move the navigation bar down to the original display position.

In an optional embodiment, the apparatus further includes a removing module.

The removing module is configured to remove the display of the operation control in the navigation bar when a displayed duration of the operation control reaches a preset threshold and the first touch signal is not received yet.

In an optional embodiment, the receiving module 93 is further configured to receive a second touch signal triggered on the program entry of the target application, where the target application is one of the at least one application.

The invoking module 94 is further configured to invoke the target application to process the target file.

In an optional embodiment, the acquiring module 91 includes a receiving unit and an acquiring unit.

The receiving unit is configured to receive a screenshot operation.

The acquiring unit is configured to capture the display content of the touch screen according to the screenshot operation thereby acquiring an image.

The receiving unit is further configured to receive a shooting operation.

The acquiring unit is further configured to shoot a picture according to the shooting operation thereby to obtain an image.

The receiving unit is further configured to receive a downloading operation.

The obtaining unit is further configured to download according to the downloading operation thereby to obtain an image.

In an optional embodiment, the invoking module 94 is further configured to invoke the target application to share or process the image.

In an optional embodiment, the target file is an audio or a video.

The invoking module 94 is further configured to invoke the target application to share or play the target file.

An embodiment of the disclosure further provides a computer-readable medium. The computer-readable medium stores at least one instruction, and the at least one instruction is loaded and executed by a processor to implement the information display methods according to the foregoing embodiments.

An embodiment of the disclosure further provides a computer program product. The computer program product stores at least one instruction, and the at least one instruction is loaded and executed by a processor to implement the information display methods according to the foregoing embodiments.

Those skilled in the art should be aware that in one or more of the above examples, the functions described in the embodiments of the present disclosure may be implemented by hardware, software, firmware, or any combination thereof. When implemented in software, these functions may be stored in or transmitted over as one or more instructions or code on a computer-readable medium. Computer-readable media includes computer storage media and communication media including any medium that facilitates transfer of a computer program from one place to another. A storage media may be any available media that can be accessed by a general purpose or special purpose computer.

The above are only preferred embodiments of the present disclosure, and are not intended to limit the present disclosure. Any modification, equivalation, or improvement made

What is claimed is:

1. An information display method, applied to a terminal, wherein the terminal comprises a processor, a memory, and a screen, the memory stores at least one instruction which, when executed by the processor, cause the processor to implement the method, the method comprises:
   displaying a navigation bar on a user interface, the user interface being displayed on the screen, the navigation bar being continuously displayed at a lower portion of the user interface and comprising a Back button, a Home button, and a Menu button;
   acquiring a target file through a user operation;
   adding and displaying an operation control of the target file in the navigation bar, a thumbnail or a file name of the target file being displayed on the operation control;
   receiving a first touch signal triggered on the operation control; and
   displaying, according to the first touch signal, a virtual operation bar on the user interface, and displaying a program entry of at least one application in the virtual operation bar, the at least one application being configured to process the target file.

2. The method as claimed in claim 1, wherein adding and displaying an operation control of the target file in the navigation bar comprises:
   displaying the navigation bar, the navigation bar comprising the operation control of the target file, the thumbnail or the file name of the target file being displayed on the operation control.

3. The method as claimed in claim 1, wherein displaying, according to the first touch signal, a virtual operation bar on the user interface, and displaying a program entry of at least one application in the virtual operation bar comprises:
   moving, according to the first touch signal, the navigation bar upwardly from an original display position; and
   displaying the virtual operation bar at the original display position of the navigation bar, and the virtual operation bar displaying the program entry of the at least one application.

4. The method as claimed in claim 3, further comprising:
   displaying a close button on the virtual operation bar;
   receiving a third touch signal triggered on the close button; and
   closing the virtual operation bar according to the third touch signal, and moving the navigation bar down to the original display position.

5. The method as claimed in claim 1, after adding and displaying an operation control of the target file in the navigation bar, the method further comprises:
   removing the display of the operation control from the navigation bar, when a displayed duration of the operation control reaches a preset threshold and it is failed to receive the first touch signal yet.

6. The method as claimed in claim 1, after displaying, according to the first touch signal, a virtual operation bar on the user interface, and displaying a program entry of at least one application in the virtual operation bar, the method further comprises:
   receiving a second touch signal triggered on the program entry of a target application, the target application being one of the at least one application; and
   invoking the target application to process the target file.

7. The method as claimed in claim 6, wherein the target file is an image; and
   acquiring, by the terminal, a target file comprises:
   receiving a screenshot operation, and capturing the display content of a touch screen according to the screenshot operation thereby to obtain an image.

8. The method as claimed in claim 7, wherein invoking the target application to process the target file comprises at least one of:
   invoking the target application to share the image to a contact in the target application;
   invoking the target application to send the image to an information space of the target application;
   invoking the target application to crop the image;
   invoking the target application to beautify the image;
   invoking the target application to print image elements of the image;
   or,
   invoking the target application to save the image.

9. The method as claimed in claim 6, wherein the target file is an audio or a video;
   invoking the target application to process the target file comprises at least one of:
   invoking the target application to play the target file;
   invoking the target application to share the target file to a contact in the target application;
   invoking the target application to send the target file to an information space of the target application;
   or,
   invoking the target application to clip the target file.

10. A terminal, comprising a processor, a memory and a screen, wherein the memory stores at least one instruction which, when executed by the processor, cause the processor to implement an information display method, the method comprises:
    displaying a navigation bar on a user interface of an Android operating system, the user interface being displayed on the screen, the navigation bar being continuously displayed at a lower portion of the user interface and comprising a Back button, a Home button, and a Menu button;
    acquiring a target file through a user operation;
    adding and displaying an operation control of the target file in the navigation bar, a thumbnail of the target file being displayed on the operation control;
    receiving a first touch signal triggered on the operation control;
    displaying, according to the first touch signal, a virtual operation bar on the user interface, and displaying a program entry of at least one application in the virtual operation bar, the at least one application being configured to process the target file;
    receiving a second touch signal triggered on the program entry of a target application, the target application being one of the at least one application; and
    invoking the target application to process the target file.

11. A computer-readable storage medium, having at least one instruction stored therein, wherein the at least one instruction is loaded and executed by a processor to implement an information display method, the method comprises:
    displaying a navigation bar on a user interface, the user interface being displayed on a screen of a terminal using an Android operating system, the navigation bar being continuously displayed at a lower portion of the user interface and comprising a Back button, a Home button, and a Menu button;
    acquiring a target file through a user operation;

adding and displaying an operation control of the target file in the navigation bar, a file name of the target file being displayed on the operation control;

receiving a first touch signal triggered on the operation control;

moving, according to the first touch signal, the navigation bar upwardly from an original display position;

displaying a virtual operation bar at the original display position of the navigation bar, the virtual operation bar displaying a program entry of at least one application, the at least one application being configured to process the target file;

displaying a close button on the virtual operation bar;

receiving a third touch signal triggered on the close button;

closing the virtual operation bar; and moving the navigation bar downwardly to the original display position.

12. The method as claimed in claim 3, wherein the virtual operation bar is stripe-shaped with a same length as the navigation bar.

13. The method as claimed in claim 6, wherein the target file is an image; and acquiring, by the terminal, a target file comprises:

receiving a shooting operation, and taking a photograph according to the shooting operation thereby to obtain an image.

14. The method as claimed in claim 6, wherein the target file is an image; and acquiring, by the terminal, a target file comprises:

receiving a download operation, and downloading according to the download operation thereby to obtain an image.

15. The method as claimed in claim 1, wherein the Back button, the Home button and the Menu button are sequentially arranged, and the operation control of the target file is displayed at the right side of the Menu button.

16. The computer-readable storage medium as claimed in claim 11, wherein the close button is displayed at an upper right corner of the virtual operation bar.

17. The computer-readable storage medium as claimed in claim 11, wherein the virtual operation bar is parallel to the navigation bar, and the virtual operation bar and the navigation bar have the same length.

18. The computer-readable storage medium as claimed in claim 11, wherein the virtual operation bar is in contact with the navigation bar.

19. The method as claimed in claim 4, wherein the close button is displayed at an upper right corner of the virtual operation bar.

20. The method as claimed in claim 1, wherein the virtual operation bar is in contact with the navigation bar.

* * * * *